US011958054B2

(12) United States Patent
Lutoslawski et al.

(10) Patent No.: US 11,958,054 B2
(45) Date of Patent: Apr. 16, 2024

(54) PULVERIZER SYSTEMS AND METHODS FOR PULVERIZING MATERIAL

(71) Applicant: TORXX KINETIC PULVERIZER LIMITED, Hamilton (BM)

(72) Inventors: Jaroslaw Lutoslawski, Bradford (CA); Mark Christopher Lugowski, Hamilton (BM)

(73) Assignee: TORXX KINETIC PULVERIZER LIMITED, Hamilton (BM)

(*) Notice: Subject to any disclaimer, the term of this patent is extended or adjusted under 35 U.S.C. 154(b) by 428 days.

(21) Appl. No.: 17/258,962

(22) PCT Filed: Jul. 12, 2019

(86) PCT No.: PCT/CA2019/050967
§ 371 (c)(1),
(2) Date: Jan. 8, 2021

(87) PCT Pub. No.: WO2020/010469
PCT Pub. Date: Jan. 16, 2020

(65) Prior Publication Data

US 2021/0339261 A1 Nov. 4, 2021

Related U.S. Application Data

(60) Provisional application No. 62/697,149, filed on Jul. 12, 2018, provisional application No. 62/697,080, filed on Jul. 12, 2018.

(51) Int. Cl.
*B02C 13/18* (2006.01)
*B02C 13/282* (2006.01)
(Continued)

(52) U.S. Cl.
CPC ............ *B02C 13/18* (2013.01); *B02C 13/282* (2013.01); *B02C 13/288* (2013.01);
(Continued)

(58) Field of Classification Search
CPC ..... B02C 13/18; B02C 13/288; B02C 13/282; B02C 13/2825; B02C 13/2808
See application file for complete search history.

(56) References Cited

U.S. PATENT DOCUMENTS

| | | |
|---|---|---|
| 375 A | 9/1837 | Smith |
| 7,000 A | 1/1850 | Goshon |

(Continued)

FOREIGN PATENT DOCUMENTS

| | | |
|---|---|---|
| CA | 2147666 A1 | 10/1996 |
| CA | 2243421 A1 | 1/1999 |

(Continued)

OTHER PUBLICATIONS

WO 2017050223 A1, U.S. Pat. No. 10,384,212 B2.
(Continued)

*Primary Examiner* — Faye Francis
(74) *Attorney, Agent, or Firm* — Brooks Kushman P.C.

(57) ABSTRACT

A pulverizer for reducing a size of input material particles having a housing, a rotatable shaft with rotor arms and at least one airflow deflector cooperating with the rotor arms to deflect airflow within the pulverizer so as to form at least two overlapping vortices within the interior chamber such that input material particles in suspension in both overlapping vortices collide with each other to be thereby pulverized. The pulverizer also having a housing liner including a plurality of housing liner portions attached to and extending along a outer structural wall of the housing. The pulverizer also having a housing sidewall having an outer structural wall with a plurality of wall sections. The pulverizer also having canted rotor arms and rotor arms with removable wear pads. An anti-caking device for a vessel such as a pulverizer is also provided.

25 Claims, 25 Drawing Sheets

(51) Int. Cl.

| | |
|---|---|
| ***B02C 13/288*** | (2006.01) |
| *B02C 13/14* | (2006.01) |
| *B02C 13/28* | (2006.01) |
| *B02C 13/286* | (2006.01) |
| *B02C 13/30* | (2006.01) |

(52) U.S. Cl.
CPC *B02C 2013/145* (2013.01); *B02C 2013/2808* (2013.01); *B02C 2013/2825* (2013.01); *B02C 2013/28636* (2013.01); *B02C 13/30* (2013.01)

(56) References Cited

U.S. PATENT DOCUMENTS

| | | | |
|---|---|---|---|
| 56,672 | A | 7/1866 | Heneage |
| 125,172 | A | 4/1872 | Chichester |
| 134,513 | A | 1/1873 | Chichester |
| 248,923 | A | 11/1881 | Dechamp |
| 277,138 | A | 5/1883 | Knight |
| 441,372 | A | 11/1890 | Morse |
| 499,795 | A | 6/1893 | Morse |
| 964,102 | A | 7/1910 | Gordon |
| 1,758,010 | A | 7/1910 | Gordon |
| 1,048,869 | A | 12/1912 | Pitcairn |
| 1,197,888 | A | 9/1916 | Adams |
| 1,212,418 | A | 1/1917 | Sturtevant |
| 1,212,419 | A | 1/1917 | Sturtevant |
| 1,300,192 | A | 4/1919 | Overstrom |
| 1,608,717 | A | 11/1926 | Bell |
| 1,636,033 | A | 7/1927 | Agnew |
| 1,656,756 | A | 1/1928 | Payne |
| 1,669,239 | A | 5/1928 | Grindle |
| 1,798,465 | A | 3/1931 | Grindle |
| 1,911,193 | A | 5/1933 | Hill |
| 1,935,344 | A | 11/1933 | Andrews et al. |
| 2,012,694 | A | 8/1935 | Runyan |
| 2,092,307 | A | 9/1937 | Gaffney |
| 2,093,703 | A | 9/1937 | Blodgett |
| 2,130,064 | A | 9/1938 | Bucky |
| 2,164,409 | A | 7/1939 | Johnson |
| 2,171,525 | A | 9/1939 | Ainsa |
| 2,248,927 | A | 7/1941 | Ainsa |
| 2,259,939 | A | 10/1941 | Garcia |
| 2,275,595 | A | 3/1942 | Schwartz |
| 2,355,784 | A | 8/1944 | Dondlinger |
| 2,367,906 | A | 1/1945 | Wall et al. |
| 2,392,958 | A | 1/1946 | Tice |
| 2,546,286 | A | 3/1951 | Zakel |
| 2,562,560 | A | 7/1951 | Macartney |
| 2,592,994 | A | 4/1952 | Ahlmann |
| 2,595,117 | A | 4/1952 | Ahlmann |
| 2,639,747 | A | 5/1953 | Burn et al. |
| 2,700,512 | A | 1/1955 | Denovan et al. |
| 2,707,594 | A | 5/1955 | Moore |
| 2,709,552 | A | 5/1955 | Lecher |
| 2,713,977 | A | 7/1955 | Noll |
| 2,750,120 | A | 6/1956 | Pallmann |
| 2,847,168 | A | 8/1958 | Smiley |
| 2,917,248 | A | 12/1959 | Krug et al. |
| 2,919,864 | A | 1/1960 | Parmele |
| 2,937,815 | A | 5/1960 | Eirich et al. |
| 2,940,676 | A | 6/1960 | Brake |
| 2,981,489 | A | 4/1961 | Hannum, Jr. |
| 2,992,783 | A | 7/1961 | Wirth et al. |
| 3,015,392 | A | 1/1962 | Rozsa et al. |
| 3,062,459 | A | 11/1962 | Dearing |
| 3,065,919 | A | 11/1962 | Le |
| 3,071,330 | A | 1/1963 | Jackering |
| 3,123,115 | A | 3/1964 | Howard |
| 3,155,326 | A | 11/1964 | Rhodes |
| 3,160,354 | A | 12/1964 | Le |
| 3,180,582 | A | 4/1965 | Danyluke |
| 3,207,447 | A | 9/1965 | Whitham |
| 3,210,016 | A | 10/1965 | Sevin et al. |
| 3,302,895 | A | 2/1967 | Ryder |
| 3,326,476 | A | 6/1967 | De Los Santos Izquierdo |
| 3,329,350 | A | 7/1967 | Wisgerhof et al. |
| 3,346,203 | A | 10/1967 | Danyluke |
| 3,426,673 | A | 2/1969 | Miner et al. |
| 3,474,974 | A | 10/1969 | Wood |
| 3,490,704 | A | 1/1970 | Bourne et al. |
| 3,555,996 | A | 1/1971 | Schwarz et al. |
| 3,615,008 | A | 10/1971 | Alpha |
| 3,834,631 | A | 9/1974 | King |
| 3,873,034 | A | 3/1975 | Wahori et al. |
| 3,887,141 | A | 6/1975 | Francis |
| 3,946,953 | A | 3/1976 | Hato |
| 3,976,002 | A | 8/1976 | Gerlach |
| 3,987,970 | A | 10/1976 | Burkett |
| 4,030,670 | A | 6/1977 | Abernathy |
| 4,098,466 | A | 7/1978 | MacElvain et al. |
| 4,144,167 | A | 3/1979 | Burkett et al. |
| 4,151,794 | A | 5/1979 | Burkett |
| 4,151,959 | A | 5/1979 | Deister |
| 4,202,078 | A | 5/1980 | Malinak |
| 4,493,459 | A | 1/1985 | Burkett |
| 4,531,461 | A | 7/1985 | Sayler et al. |
| 4,593,861 | A | 6/1986 | Blakley et al. |
| 4,637,561 | A | 1/1987 | Edberg |
| 4,690,338 | A | 9/1987 | Sayler et al. |
| 4,886,216 | A | 12/1989 | Goble |
| 4,989,796 | A | 2/1991 | Eide |
| 5,067,661 | A | 11/1991 | Eide |
| 5,184,781 | A | 2/1993 | Andela |
| 5,192,029 | A | 3/1993 | Harris |
| 5,205,500 | A | 4/1993 | Eide |
| 5,379,951 | A | 1/1995 | Hughes |
| 5,680,994 | A | 10/1997 | Eide et al. |
| 5,685,500 | A | 11/1997 | Eide et al. |
| 5,839,671 | A | 11/1998 | Sand et al. |
| 6,024,307 | A | 2/2000 | Sand et al. |
| 6,129,297 | A | 10/2000 | Sawant et al. |
| 6,135,370 | A | 10/2000 | Arnold |
| 6,179,231 | B1 | 1/2001 | Csendes |
| 6,227,473 | B1 | 5/2001 | Arnold |
| 6,685,116 | B1 | 2/2004 | Hisazumi et al. |
| 6,726,133 | B2 | 4/2004 | Hahn et al. |
| 7,950,601 | B2 | 5/2011 | Watts |
| 8,020,791 | B2 | 9/2011 | Knueven et al. |
| 8,267,337 | B2 | 9/2012 | Webb |
| 8,678,306 | B2 | 3/2014 | Watts |
| 9,498,780 | B2 | 11/2016 | Watts et al. |
| 9,707,564 | B2 | 7/2017 | Mogan et al. |
| 9,751,087 | B2 | 9/2017 | Watts et al. |
| 10,384,212 | B2 | 8/2019 | Chen |
| 2008/0272217 | A1 | 11/2008 | Schmitz et al. |
| 2009/0250538 | A1 | 10/2009 | Schmitz et al. |
| 2010/0301148 | A1 | 12/2010 | Arnone et al. |
| 2013/0126647 | A1 * | 5/2013 | Arnold .................... B02C 13/26 241/38 |
| 2014/0166795 | A1 | 6/2014 | Mogan et al. |
| 2017/0304833 | A1 | 10/2017 | Mogan |
| 2019/0001336 | A1 | 1/2019 | Lutoslawski et al. |
| 2019/0001337 | A1 | 1/2019 | Lutoslawski |

FOREIGN PATENT DOCUMENTS

| | | | | |
|---|---|---|---|---|
| CA | 2685183 | C | 11/2008 | |
| CA | 2767006 | C | 1/2011 | |
| CA | 2890555 | A1 | 5/2014 | |
| CA | 2923948 | C | 3/2015 | |
| CA | 2966255 | C | 8/2016 | |
| CA | 2975622 | A1 | 8/2016 | |
| CA | 2976406 | A1 | 8/2016 | |
| CA | 2993774 | A1 | 2/2017 | |
| CA | 3029673 | A1 | 1/2018 | |
| CA | 2963654 | A1 | 7/2018 | |
| CA | 2963657 | A1 | 7/2018 | |
| CN | 1310643 | A | 8/2001 | |
| DE | 202014008874 | U1 * | 4/2015 | ............. B02C 13/14 |
| EP | 0202424 | B1 | 8/1990 | |
| GB | 2202463 | A | 9/1988 | |
| JP | S63265638 | A | 11/1988 | |
| KR | 20060091851 | A * | 8/2006 | ............. B02C 13/30 |
| WO | 1989008752 | A1 | 9/1989 | |

(56) References Cited

FOREIGN PATENT DOCUMENTS

| | | | |
|---|---|---|---|
| WO | 1993002797 | A1 | 2/1993 |
| WO | 1998055234 | A1 | 12/1998 |
| WO | 2008131477 | A1 | 11/2008 |
| WO | 2017050223 | A1 | 3/2017 |
| WO | 2018005836 | A1 | 1/2018 |
| WO | 2019048012 | A1 | 3/2019 |

OTHER PUBLICATIONS

Supplementary Partial European Search Report for EP Application No. 19835143.9, dated Mar. 28, 2022, 13 pages.
Office Action for Chinese Application No. 201980046860.X, dated May 12, 2022, 8 Pages.
International Search Report of PCT/CA2019/050967 dated Sep. 13, 2019, 5 pages.
Written Opinion of PCT/CA2019/050967 dated Sep. 13, 2019, 7 pages.

* cited by examiner

PULVERIZER SYSTEMS AND METHODS FOR PULVERIZING MATERIAL

CROSS-REFERENCE TO RELATED APPLICATIONS

This application is the U.S. national phase of International Application No. PCT/CA2019/050967 filed Jul. 12, 2019, which claims the benefit of U.S. Provisional Application Ser. No. 62/697,080 filed Jul. 12, 2018 and 62/697,149 flied Jul. 12, 2018, the disclosures of which are incorporated in their entirety by reference herein.

TECHNICAL FIELD

The technical field generally relates to pulverizers, and more specifically to high speed pulverizers and to methods for pulverizing input materials. The technical field further relates to anti-caking systems and methods for removing caked on material from a wall of an apparatus.

BACKGROUND

Pulverizing apparatuses, or "pulverizers", have been used for pulverizing, separating, aerating and/or homogenizing solid materials such as waste material. Pulverizers are sometimes used in certain industrial transformation operations to reduce the particle size of an input material such as ore or the like.

Existing pulverizers often suffer from a number of drawbacks. Some pulverizers may not allow the input material particles to be reduced to a desirable size. Moreover, various components of the pulverizer may suffer from deterioration and wear due to fast moving materials and flow currents, and consequently require to be changed relatively frequently. Some components, such as the sidewall of the drum, can be difficult to replace when damaged, resulting in increased downtime and thus reduced performance of the pulverizer.

SUMMARY

According to one aspect, there is provided a pulverizer comprising: a housing having top and bottom ends, the housing further having an inlet located towards the top end for receiving input material to comminute and an outlet located towards the bottom end for discharging pulverized input material from the housing, the housing including a housing sidewall extending between the top and bottom ends and defining an interior chamber, the housing having a central housing axis; a rotatable shaft extending between the top end and the bottom end of the housing along the central housing axis; at least one rotor arm extending outwardly from the rotatable shaft towards the housing sidewall for forming an airflow revolving about the central housing axis within the interior chamber when the rotatable shaft is rotated; at least one airflow deflector extending inwardly into the interior chamber from the housing sidewall, the at least one airflow deflector cooperating with the at least one rotor arm to deflect the airflow generated by the at least one rotor arm so as to form at least two overlapping vortices within the interior chamber such that input material particles in suspension in both overlapping vortices collide with each other to be thereby pulverized.

In at least one embodiment, each deflector is elongated and extends parallel to the central housing axis.

In at least one embodiment, each rotor arm extends along a rotation plane which extends orthogonally through the central housing axis, each deflector intersecting the rotation plane.

In at least one embodiment, each deflector comprises a flow facing deflecting surface extending away from the housing sidewall and inwardly into the interior chamber.

In at least one embodiment, the flow facing deflecting surface is planar.

In at least one embodiment, the flow facing deflecting surface is angled relative to an inner surface of the housing sidewall at a deflection angle of between about 1 degree and about 89 degrees, and optionally at an angle of between 30 degrees and 60 degrees.

In at least one embodiment, each deflector further comprises an opposite deflecting surface extending away from the housing sidewall and inwardly into the interior chamber, the flow facing deflecting surface and the opposite deflecting surface converging towards each other and meeting at an apex spaced inwardly from the housing sidewall.

In at least one embodiment, the apex is spaced from the housing sidewall towards the central housing axis by a radial distance of about 15 to 25 cm, and optionally of about 20 cm.

In at least one embodiment, the apex is spaced from a tip of the rotor arms by a radial distance of between about 1 cm and about 5 cm.

In at least one embodiment, each deflector is substantially symmetrical about a symmetry axis extending along a radius of the housing.

In at least one embodiment, the flow facing deflecting surface is angled relative to an inner surface of the housing sidewall at a deflection angle of between about 1 degree and about 89 degrees, and optionally at an angle of between 30 degrees and 60 degrees.

In at least one embodiment, the deflectors are substantially evenly spaced from each other in an azimuthal direction around the central housing axis.

In at least one embodiment, the at least one flow deflector includes a number of flow deflectors and the at least one rotor arm includes a number of rotor arms, the number of flow deflectors being equal to the number of the rotor arms.

In at least one embodiment, at least one flow deflector includes more than one flow deflectors.

In at least one embodiment, the at least one flow deflector includes between two and eights deflectors, and optionally includes six flow deflectors.

In at least one embodiment, the pulverizer further comprises at least one shelf extending inwardly from the housing sidewall and circumferentially around the housing sidewall, each shelf being configured to deflect the airflow directed towards the shelf upwardly to temporarily maintain the input material particles in suspension above the shelf.

In at least one embodiment, the shelf includes a top shelf face extending away from the housing sidewall and downwardly.

In at least one embodiment, the top shelf face is substantially conical.

In at least one embodiment, the top shelf face is angled away from an inner face of the housing sidewall at a shelf angle of between about 1 degree and about 89 degrees, and more specifically at an angle of between 30 and 60 degrees.

According to another aspect, there is also provided a method for pulverizing an input material, the method comprising: providing the input material into a housing of a pulverizer through a top end of the housing; generating a circular airflow within the interior chamber about a central housing axis of the housing; deflecting the airflow generated by the airflow generator so as to form at least two overlapping vortices within the interior chamber such that input material particles in suspension in both overlapping vortices collide with each other to be thereby pulverized.

In at least one embodiment, generating the circular airflow includes rotating a pulverizing rotor assembly including a rotatable shaft extending along the central housing axis and at least one rotor arm extending outwardly from the shaft towards the housing sidewall.

In at least one embodiment, rotating the pulverizing rotor assembly includes rotating the rotatable shaft at a rotation speed of between about 700 rpm and about 1100 rpm.

In at least one embodiment, rotating the pulverizing rotor assembly includes rotating the rotatable shaft at a rotation speed of between about 1000 rpm and about 1100 rpm.

In at least one embodiment, deflecting the airflow generated by the airflow generator is performed using at least one flow deflector extending inwardly into the interior chamber from the housing sidewall.

According to another aspect, there is also provided a pulverizer comprising: a housing having top and bottom ends, the housing further having an inlet located towards the top end for receiving input material to comminute and an outlet located towards the bottom end for discharging pulverized input material from the housing, the housing including a housing sidewall extending between the top and bottom ends and defining an interior chamber, the housing having a central housing axis; an airflow generator disposed in the interior chamber for generating a circular airflow revolving about the central housing axis with particles of the input material in suspension in the airflow; at least one airflow deflector extending inwardly from the housing sidewall for deflecting the airflow generated by the airflow generator so as to form at least two overlapping vortices within the interior chamber such that input material particles in suspension in both overlapping vortices collide with each other to be thereby pulverized.

According to another aspect, there is also provided a pulverizer comprising: a housing having top and bottom ends, the housing further having an inlet located towards the top end for receiving input materials to comminute and an outlet located towards the bottom end for discharging pulverized input materials from the housing, the housing including a housing sidewall extending between the top and bottom ends and defining an interior chamber, the housing sidewall comprising: an outer structural wall having an inner face and an outer face; and a housing liner extending against the inner face of the outer structural wall, the housing liner including a plurality of housing liner portions attached to and extending along the outer structural wall, each housing liner portion being detachable therefrom independently from the other housing liner portions; and at least one pulverizing rotor rotatably mounted in the interior chamber of the housing for pulverizing the input materials fed into the housing via the inlet as the input material passes through the housing from the inlet to the outlet.

In at least one embodiment, each housing liner portion are attached to the outer structural wall using at least one fastener.

In at least one embodiment, each liner portion includes at least one planar portion sized and shaped for extending against a corresponding planar portion of the inner face of the housing sidewall.

In at least one embodiment, the plurality of housing liner portions includes a plurality of shelf panels defining a shelf extending from the housing sidewall inwardly into the interior chamber.

In at least one embodiment, the housing liner portions are made of fiberglass.

In at least one embodiment, the housing liner portions are made of high-density polyethylene (HDPE).

In at least one embodiment, the housing liner portions are made of ceramic.

In at least one embodiment, the housing liner portions are made of steel.

In at least one embodiment, the housing liner portions comprise at least one of a chromium carbide overlay and a tungsten carbide overlay.

In at least one embodiment, the housing liner portions comprise a ceramic overlay.

In at least one embodiment, the outer structural wall comprises a plurality of wall sections extending between the top and bottom ends of the housing and disposed side-by-side.

According to another aspect, there is provided a pulverizer comprising: a housing having top and bottom ends, the housing further having an inlet located towards the top end for receiving input materials to comminute and an outlet located towards the bottom end for discharging pulverized input materials from the housing, the housing including a housing sidewall extending between the top and bottom ends, the housing sidewall comprising an outer structural wall comprising a plurality of wall sections extending substantially between the top and bottom ends and disposed side-by-side to form the outer structural wall; and at least one pulverizing rotor rotatably mounted in the housing for pulverizing the input materials fed into the housing via the inlet as the input material passes through the housing from the inlet to the outlet.

In at least one embodiment, each wall section has a concave inner face facing towards the interior chamber.

In at least one embodiment, each wall section comprises a plurality of planar portions disposed adjacent to each another and angled relative to each other to define the concave inner face.

In at least one embodiment, the planar portions of each wall section are angled relative to each other at an angle of between about 10 degrees and 30 degrees.

In at least one embodiment, each wall section includes a convex outer face facing located opposite the concave inner face, each wall section further including a pair of side flanges extending away from the concave inner face.

In at least one embodiment, the side flanges are angled relative to the corresponding inner panel portion between about 30 and 89 degrees.

In at least one embodiment, each side flange of the wall section extends adjacent a corresponding side flange of an adjacent wall section to define, together with the corresponding side flange, a flow deflector extending into the housing.

In at least one embodiment, the housing sidewall further comprises a housing liner disposed inside the outer structural wall, the housing liner including a plurality of housing liner portions attached to and extending along the outer structural wall, each housing liner portion being detachable therefrom independently from the other housing liner portions.

According to another aspect, there is also provided a pulverizer comprising: a housing having top and bottom ends, the housing further having an inlet located towards the top end for receiving input materials to comminute and an outlet located towards the bottom end for discharging pulverized input materials from the housing, the housing including a housing sidewall extending between the top and bottom ends and defining an interior chamber, the housing having a central housing axis; and a pulverizing rotor rotatably mounted in the interior chamber of the housing for pulverizing the input materials fed into the housing via the inlet as the input material passes through the housing from the inlet to the outlet, the pulverizing rotor including: a rotatable shaft extending between the top end and the bottom end of the housing along the central housing axis; and a plurality of arms extending outwardly from the rotatable shaft towards the housing sidewall, each arm having a proximal end located towards the rotatable shaft and a distal end located away from the rotatable shaft, each arm having a longitudinal arm axis extending through the proximal and distal ends of the arm, at least one of the arms being positioned such that the longitudinal arm axis of the at least one of arms is angled relative to a corresponding radial axis extending through the rotatable shaft and the proximal end of the at least one of arms.

In at least one embodiment, the at least one of the arms is positioned such that the longitudinal arm axis is angled relative to the corresponding radial axis by an angle of between about 5 degrees and about 90 degrees.

In at least one embodiment, the pulverizing rotor includes a rotor hub connected to the rotating shaft, the arms extending outwardly from the rotor hub.

In at least one embodiment, each hub comprises a release mechanism for allowing the arms to move from a first position in which the longitudinal arm axis is angled relative to the corresponding radial axis at the canting angle to a second position in which the longitudinal arm axis is angled relative to the corresponding radial axis at an angle different from the canting angle upon application of a predetermined force on a given arm.

In at least one embodiment, the release mechanism is configured to allow each arm to move from the first position to the second position independently from the other arms.

In at least one embodiment, the release mechanism comprises at least one mechanical fuse configured to retain a corresponding arm in the first position, each mechanical fuse being adapted to release the corresponding arm when the predetermined force is applied on the corresponding arm.

In at least one embodiment, the hub includes a top plate and a bottom plate, and wherein each arm comprises a proximal portion sandwiched between the top and bottom plates, and a distal portion extending from the hub into the interior chamber.

In at least one embodiment, the arms are connected to the hub between the top and bottom plates via a first connector and a second connector extending through the arm and at least one of the top and bottom plates.

In at least one embodiment, the second connector is the mechanical fuse, and wherein when the mechanical fuse releases the arm, the arm is allowed to pivot about the first connector.

In at least one embodiment, the mechanical fuse is a shear pin configured to break when the predetermined force is applied on the arm.

In at least one embodiment, the second connector has a smaller diameter than the first connector.

In at least one embodiment, the predetermined force is about one half of a shear failure force of the arms.

In at least one embodiment, the hub comprises at least one coverplate mounted on the top plate to at least partially surround the first and second connectors for protecting the first and second connectors.

In at least one embodiment, the coverplate comprises a first portion and a second portion interlocked with a puzzle connection.

In at least one embodiment, the pulverizing rotor comprises a plurality of rotor hubs connected to the rotating shaft and spaced from each other along the rotating shaft, each hub having a set of arms extending outwardly therefrom.

According to another aspect, there is also provided a pulverizer comprising: a housing having top and bottom ends, the housing further having an inlet located towards the top end for receiving input materials to comminute and an outlet located towards the bottom end for discharging pulverized input materials from the housing, the housing including a housing sidewall extending between the top and bottom ends and defining an interior chamber, the housing having a central housing axis; and a pulverizing rotor rotatably mounted in the interior chamber of the housing for pulverizing the input materials fed into the housing via the inlet as the input material passes through the housing from the inlet to the outlet, the pulverizing rotor including: a rotatable shaft extending between the top end and the bottom end of the housing along the central housing axis; and a plurality of arms extending outwardly from the rotatable shaft towards the housing sidewall, each arm having a proximal end located towards the rotatable shaft and a distal end located away from the rotatable shaft, each arm comprising a wear pad connected at a distal end thereof, the wear pad having a front face shaped and sized to impact materials fed into the pulverizer during rotation of the arms.

In at least one embodiment, the wear pad has rounded peripheral edges.

In at least one embodiment, the wear pad is connected to the arm using at least one bolt extending through the front face and the arm.

In at least one embodiment, the front face of the wear pad includes at least one recess, each recess being shaped and sized to receive a bolt head of a corresponding bolt connecting the wear pad to the arm.

In at least one embodiment, the bolt head is coplanar with the front face when received in the recess.

In at least one embodiment, the bolt head is recessed relative to the front face when received in the recess.

In at least one embodiment, rotation of the bolt head is blocked when the bolt head is received in the corresponding recess.

In at least one embodiment, the wear pad extends along the distal portion of the arm and has a length defined between opposite rear and forward faces, and wherein the wear pad has a height exceeding a height of the arm.

In at least one embodiment, the height of the wear pad exceeding the height of the arm is no more than about 300%.

In at least one embodiment, the height of the wear pad exceeding the height of the arms is at least by about 150%.

In at least one embodiment, the wear pad has a rear face opposite the front face and further comprises a channel extending on the rear face along the length of the pad, the channel being shaped and sized to at least partially receive the distal portion of the arm.

In at least one embodiment, the rear face of the pad comprises a top flange and a bottom flange provided on either side of the channel and extending therealong between the lateral faces, the top and bottom flanges being adapted to at least partially wrap around the distal portion of the arm.

In at least one embodiment, a thickness of the top and bottom flanges is variable along the length of the pad.

In at least one embodiment, the thickness of one of the top and bottom flanges increases towards the distal end of the arm, and wherein the thickness of the other one of the top and bottom flanges decreases towards the distal end of the arm.

In at least one embodiment, the wear pad is configured to be flipped on the arm to increase a lifespan thereof.

In at least one embodiment, the pads are made of a wear-resistant material selected from a group consisting of: steel and alloys thereof, tungsten carbide, chromium carbide, ceramic, cast iron.

In at least one embodiment, the pads are made of AR steel.

In at least one embodiment, the wear pad comprises one or more wear indicators provided on the corresponding front face for indicating a level of wear of the wear pad.

In at least one embodiment, the wear indicators are one of grooves and bores having a predetermined depth, whereby wear of the wear pad causes the depth of at least one wear indicator to decrease.

In at least one embodiment, each arm comprises an arm protector connected thereto and extending between the hub and the wear pad for protecting the arm.

In at least one embodiment, the arm protector comprises at least one pad engaging element extending from a first end of the arm protector, and wherein the wear pad comprises one or more pad slots provided along at least one of the lateral faces for receiving the at least one pad engaging element.

In at least one embodiment, each arm comprises a protector slot facing away from the hub, and wherein the arm protector comprises at least one arm engaging element extending from a second end of the arm protector and being shaped and sized to be received in the protector slot for connecting the arm protector to the arm.

In at least one embodiment, the arm engaging elements and pad engaging elements are substantially identical to allow the arm protector to be flipped on the arm to increase a lifespan thereof.

In at least one embodiment, the arm protector comprises a curved front surface to increase aerodynamics of the arm during rotation.

In at least one embodiment, the arm protector comprises one or more wear indicators provided on the corresponding front face for indicating a level of wear of the arm protector.

In at least one embodiment, the wear indicators are one of grooves and bores having a predetermined depth, whereby wear of the arm protector causes the depth of at least one wear indicator to decrease.

According to another aspect, there is also provided a pulverizer comprising: a housing having top and bottom ends, the housing further having an inlet located towards the top end for receiving input materials to comminute and an outlet located towards the bottom end for discharging pulverized input materials from the housing, the housing including a housing sidewall extending between the top and bottom ends and defining an interior chamber, the housing having a central housing axis; and a pulverizing rotor rotatably mounted in the interior chamber of the housing for pulverizing the input materials fed into the housing via the inlet as the input material passes through the housing from the inlet to the outlet; a motor operatively coupled to the pulverizing rotor for rotating the pulverizing rotor; a sensor mounted to one of the housing and the pulverizing rotor for monitoring a condition of a corresponding one of the housing and the pulverizing rotor; a processor operatively connected to the rotary actuator and to the sensor for controlling a rotation speed of the pulverizing rotor based at least partially on the condition sensed by the sensor.

In at least one embodiment, the motor includes a variable speed motor.

In at least one embodiment, the pulverizer further comprises a conveyor for feeding material into the inlet of the housing body, the processor being operatively connected to the conveyor to control a speed of the conveyor based on the condition sensed by the sensor.

In at least one embodiment, the sensor comprises a vibration sensor, and wherein the processor is adapted to decrease the speed of at least one of the conveyor and the motor if vibrations exceed a first vibration threshold.

In at least one embodiment, the processor is adapted to stop rotation of the pulverizing rotor if the vibrations exceed a second vibration threshold.

In at least one embodiment, the processor is configured for controlling a pressure within the interior chamber.

In at least one embodiment, the pulverizer further comprises a dust collection system operatively coupled to the housing, the processor being operatively connected to the dust collection system for controlling the dust collection system based on the condition sensed by the sensor.

In at least one embodiment, the pulverizing rotor includes a rotatable shaft and a plurality of arms extending outwardly from the rotatable shaft towards the housing sidewall, the sensor comprising a rotatable shaft speed sensor operatively coupled to the rotatable shaft for monitoring a rotation speed of the rotatable shaft.

In at least one embodiment, the processor is adapted to detect wrapping of material about the arms based on performance of the pulverizer.

In at least one embodiment, upon detection of wrapping of material about the arms, the processor is adapted to reverse direction of rotation of the rotating shaft in order to dislodge the wrapped material.

According to another aspect, there is also provided a vessel for processing material, comprising: a wall defining at least part of the vessel, the wall comprising an internal surface facing towards an interior chamber of the vessel, the internal surface receiving caked material during processing of the material in the vessel; an anti-caking device extending into the wall, the anti-caking device comprising: a casing recessed into the wall beyond the internal surface and having an internal cavity; a pushing force generator coupled to the casing for generating a pushing force from within the internal cavity towards the interior chamber of the vessel to push the caked material away from the wall from behind the caked material and into the interior chamber.

In at least one embodiment, the pushing force generator comprises a solid component provided in the cavity of the casing and being displaceable between a closed position and an open position where the solid component extends to push against a portion of the caked material for displacing the same away from the internal surface of the wall.

In at least one embodiment, the solid component comprises a plunger having a plunger head that pushes against a portion of the caked material in the open position.

In at least one embodiment, the solid component is configured to move between the open and closed positions axially within the casing and perpendicular with respect to the wall.

In at least one embodiment, the pushing force generator further comprises a fluid inlet configured to provide a flow of fluid to aid removal of the caked material.

In at least one embodiment, the fluid inlet is formed as a gap between the solid component and the casing when the solid component is in the open position.

In at least one embodiment, the pushing force generator comprises: a fluid supply configured to supply a flow of fluid; a fluid inlet coupled to the casing and being in fluid communication with the fluid supply, the fluid inlet being configured to operated between a closed configuration and an open configuration where the fluid supply the fluid flows through the fluid inlet to enter between the interior surface of the wall and the caked material to push against a portion of the caked material for displacing the same away from the internal surface of the wall.

In at least one embodiment, the pushing force generator further comprises a solid component provided in the internal cavity of the casing and being displaceable between a closed position and an open position where the solid component extends to push against a portion of the caked material for displacing the same away from the internal surface of the wall, and wherein in the open position a gap in formed in between the solid component and the casing to define the fluid inlet.

In at least one embodiment, the vessel is configured as a pulverizer for pulverizing input material fed therein.

According to another aspect, there is also provided an anti-caking device for removing caked material from a surface of a wall, the device comprising: a casing recessed into the wall and extending beyond the surface, the casing having an internal cavity; a pushing force generator coupled to the casing for generating a pushing force from within the internal cavity outwardly from the wall to push the caked material away from the wall from behind the caked material.

In at least one embodiment, the pushing force generator includes a plunger received in the casing, the plunger having a plunger head with a distal surface, the plunger being movable axially within the casing between a first position in which the plunger head is aligned with respect to the surface of the wall and a second position in which the plunger head is spaced from the surface to provide a gap between the plunger head and the surface of the wall.

In at least one embodiment, the distal surface of the plunger head is configured to be flush with the surface of the wall when in the first position.

In at least one embodiment, the casing has an end portion that abuts against the wall and has an end surface that is flush with the surface of the wall.

In at least one embodiment, the end surface of the casing is flush with the distal surface of the plunger head when in the first position.

In at least one embodiment, the plunger is spring biased to return to the first position.

In at least one embodiment, the plunger head comprises a proximal surface sized and shaped to fit into a corresponding recess in the casing when in the first position.

In at least one embodiment, the proximal surface is tapered.

In at least one embodiment, the pushing force generator further includes a fluid supply in communication with the internal cavity of the casing, the fluid supply being configured to provide a fluid through the internal cavity of the casing and out of the gap when the plunger is in the second position to assist in removing the caked material from the surface of the wall.

In at least one embodiment, the fluid supply is configured to provide the fluid under pressure to move the plunger to the second position.

In at least one embodiment, the fluid is air.

In at least one embodiment, the fluid supply is configured to provide the fluid is through the gap at no more than about 40 psig.

In at least one embodiment, the fluid supply is configured to provide the fluid at a preselected pressure.

In at least one embodiment, the fluid supply is configured to provide the fluid at a pressure of 5 to 10 psig.

In at least one embodiment, the fluid supply is configured to provide the fluid under pressure for a preselected time.

In at least one embodiment, the fluid supply is configured to provide the fluid under pressure at different intervals, the fluid being provided at a different fluid pressure at each interval.

In at least one embodiment, the pressure of the fluid progressively increases from one interval to a subsequent interval.

In at least one embodiment, the device further comprises a control system configured for controlling the pressure of the fluid with the plunger in the second position.

In at least one embodiment, the control system further comprises a processing unit and at least one valve operatively connected to the processing unit to allow the processing unit to control the at least one valve.

In at least one embodiment, the fluid supply is configured such that the fluid displaces a portion of the caked material having a larger area than the area of the plunger head when in the second position.

According to another aspect, there is also provided a method of removing caked material from an internal surface of a wall of a pulverizer, comprising displacing a portion of the caked material toward an interior of the pulverizer by axial movement of a pushing force generator through the wall and toward the interior of the pulverizer.

In at least one embodiment, the pushing force generator is as defined above.

DETAILED DESCRIPTION

Figure 1:
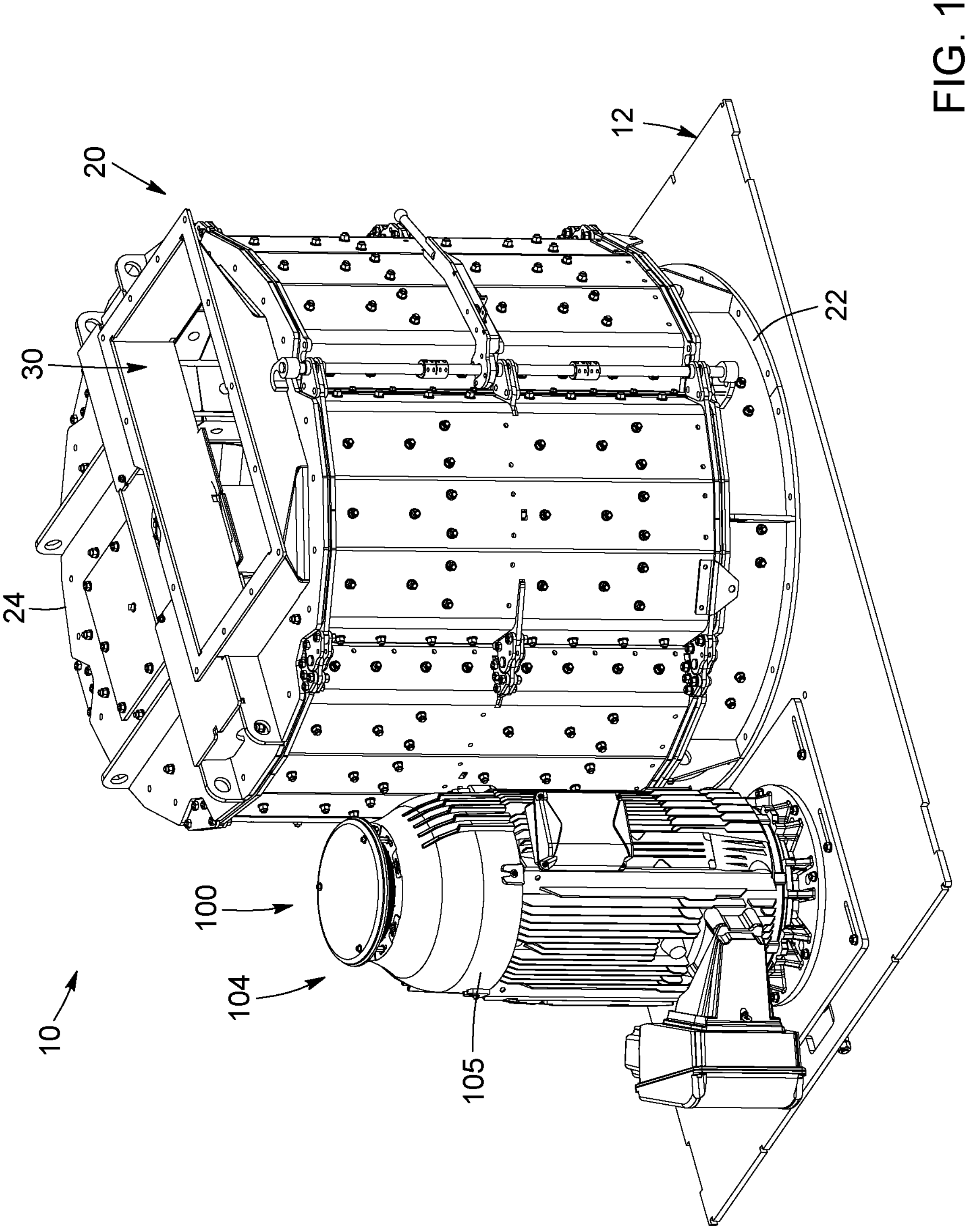
FIG. 1 is a left-side perspective view of a pulverizing apparatus, showing a motor and a housing for the pulverizing apparatus, according to an embodiment.
Figure 2:
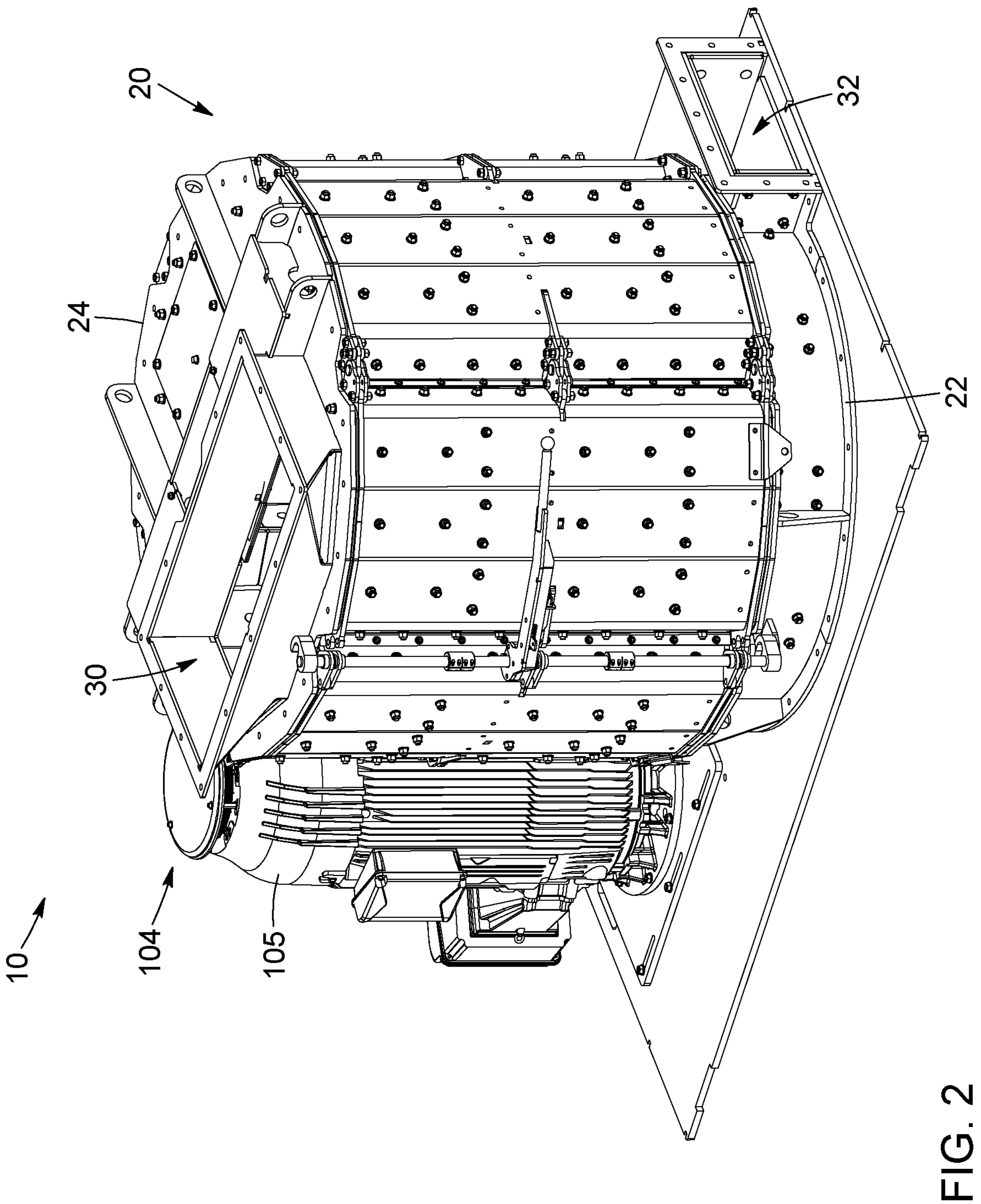
FIG. 2 is a right-side perspective view of the pulverizing apparatus illustrated in FIG. 1, showing an outlet proximate the bottom end of the housing.
Figure 3:
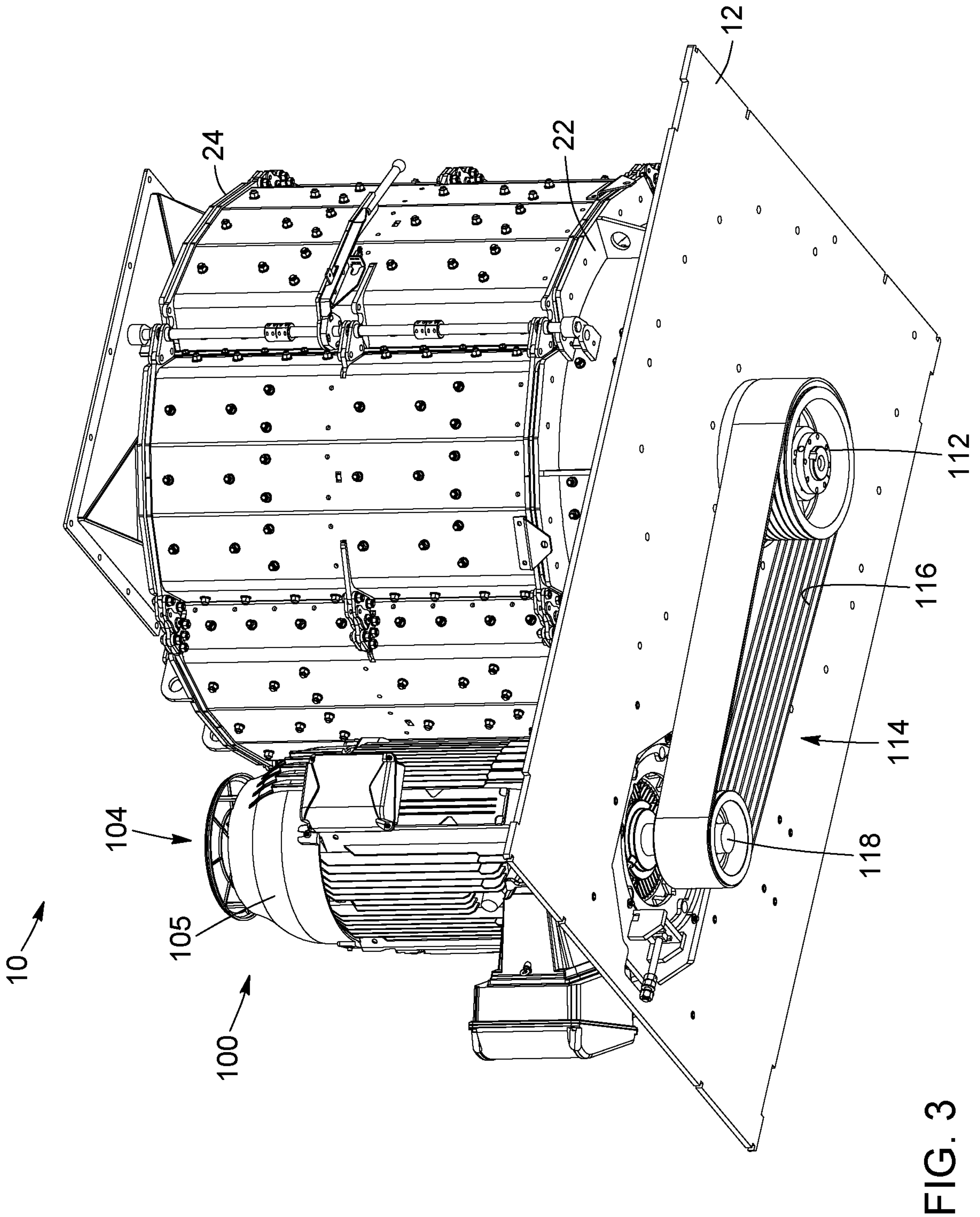
FIG. 3 is a bottom perspective view of the pulverizing apparatus illustrated in FIG. 1, showing a belt connection connecting the motor and a rotatable shaft.
Figure 4:
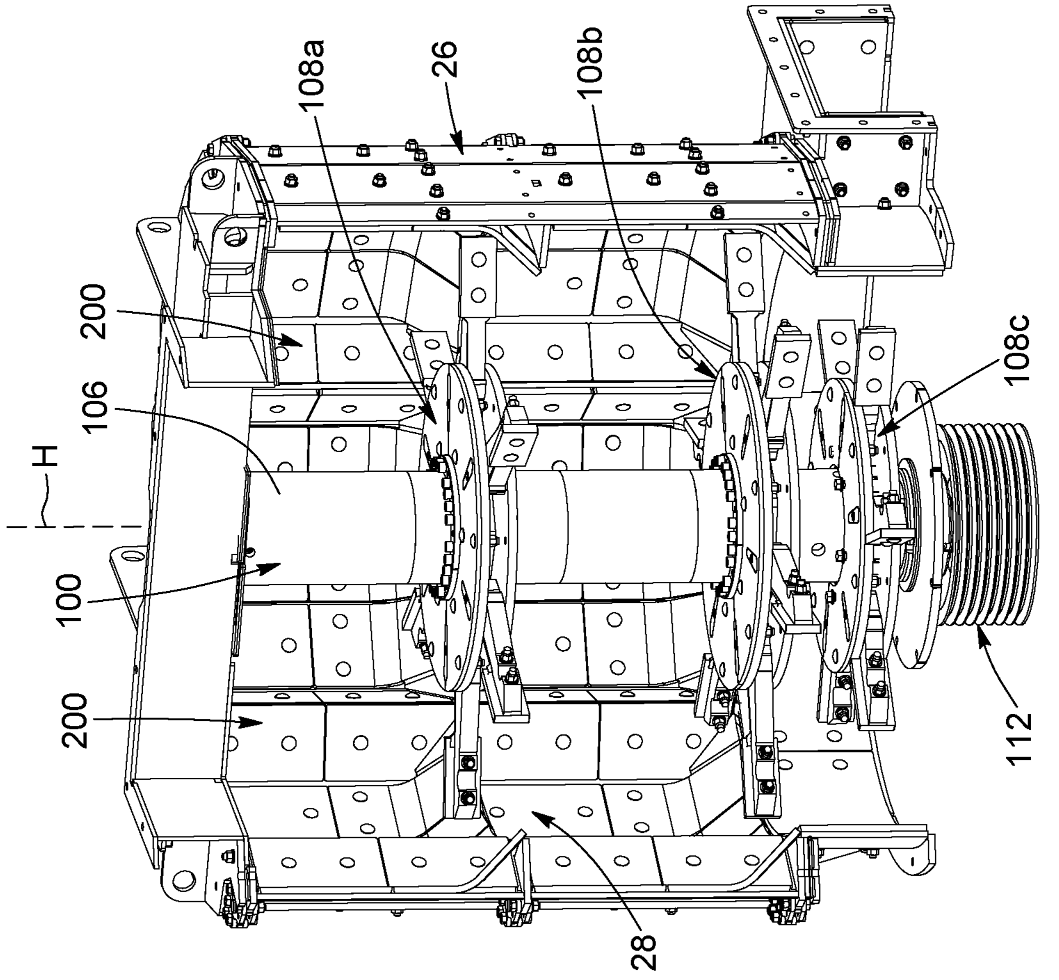
FIG. 4 is a section view of the housing illustrated in FIG. 2, showing the rotatable shaft and rotors positioned within the housing.

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art, that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

For the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only.

Moreover, it will be appreciated that positional descriptions such as “above”, “below”, “top”, “bottom”, “forward”, “rearward” “left”, “right” and the like should, unless otherwise indicated, be taken in the context of the figures and correspond to the position and orientation in the pulverizer and corresponding parts when being used. Positional descriptions should not be considered limiting.

Referring now to FIGS. 1 to 8 and 12, there is shown a pulverizer 10, in accordance with one embodiment. The pulverizer 10 is adapted to receive an input material and to pulverize or comminute the input material.

It will be understood that the terms “pulverize”, “pulverization”, “comminute” and “comminution” are used herein to refer to a reduction in size of the particles in the input material.

The input material could be completely solid or at least partially solid. Specifically, the input material could include waste, glass, compost, plastic film, rocks, ore, minerals, cement, ceramics, metal pieces or any other material which a user may want to pulverize.

In the illustrated embodiment, the pulverizer 10 includes a base 12 and a housing 20 mounted over the base 12. Specifically, the housing 20 includes a bottom end 22 connected to the base 12 and a top end 24 opposite the bottom end 22. The housing 20 is hollow and includes a housing sidewall 26 extending between the top and bottom ends 24, 22 to define an interior chamber 28 in which the pulverization occurs. Specifically, the housing 20 includes an inlet 30 located at the top end 24 to receive the input material and an outlet 32 located at the bottom end 22 through which the pulverized material may be discharged once having been pulverized in the interior chamber 26. In the illustrated embodiment, the outlet 32 allows pulverized material to be discharged in a tangential direction to the housing sidewall 26. It will be understood that the outlet 32 may be configured differently. For example, the outlet 32 may be located in a bottom face of the housing 20 such that the pulverized material may be discharged in an axial direction downwardly from the housing 20. It will also be understood that alternatively, the outlet 32 may not be positioned exactly at the bottom end 22 of the housing 20 and may be positioned generally towards the bottom end 22. Similarly, the inlet 30 may not be positioned exactly at the upper end 24 of the housing 20 and may instead be located generally towards the upper end 24.

In the illustrated embodiment, the housing 20 is generally cylindrical and defines a central housing axis H extending between the top and bottom ends 24, 22 of the housing 20. The housing 20 is adapted to be disposed such that the central housing axis H extends substantially vertically when the pulverizer 10 is in operation. In this configuration, the input material fed into the inlet 30 will ultimately tend to fall down towards the outlet 32 by gravity.

In the illustrated embodiment, the pulverization of the input material involves causing particles of input material to move within the interior chamber 28 such that they collide with other particles of input material at relatively high speed. More specifically, the pulverizer 10 includes an airflow generator 100 which is adapted to generate a circular airflow revolving about the central housing axis H in the interior chamber 28. The particles of the input material are substantially suspended in the airflow and therefore are moved within the interior chamber 28 by the airflow.

The pulverizer 10 further includes a plurality of airflow deflectors 200 which extend inwardly from the housing sidewall 26 into the interior chamber 28 to deflect the airflow generated by the airflow generator 100. This prevents the airflow from further revolving around the central housing axis H and forces the airflow to break up into a plurality of vortices, as will be explained further below.

In the illustrated embodiment, the airflow generator 100 includes a pulverizing rotor assembly 102 disposed within the interior chamber 28 and a rotary actuator 104 operatively coupled to the pulverizing rotor assembly 102 for rotating the pulverizing rotor assembly 102 in order to generate the airflow. Specifically, the pulverizing rotor assembly 102 includes a rotatable shaft 106 located in the interior chamber 28 and extending between the top and bottom ends 24, 22 of the housing 20, along the central housing axis H, and a plurality of pulverizing rotors 108*a*, 108*b*, 108*c* secured to the rotatable shaft 106 so as to rotate about the central housing axis H when the rotatable shaft 106 is rotated.

The rotatable shaft 106 includes a top end 110 connected to the top end 24 of the housing and a bottom end 112 located towards the bottom end 22 of the housing 20. The rotatable shaft 106 may be mounted to the housing 20 via bearings located at the top and bottom ends 24, 22 of the housing 20 to maintain the rotatable shaft 106 in alignment with the central housing axis H while allowing the rotatable shaft 106 to rotate relative to the central housing axis H.

In the illustrated embodiment, the rotary actuator 104 includes a motor 105 which is located outside of the housing 20 and which is mounted to the base 12 adjacent the housing 20.

Still in the illustrated embodiment, the pulverizer 10 further includes a transmission assembly 114 for transmitting rotation of the motor 105 to the rotatable shaft 106. Specifically, the transmission assembly 114 includes a belt 116 which loops around an output shaft 118 extending from the motor 105 and the bottom end 112 of the rotatable shaft 106. Alternatively, instead of a belt, the transmission assembly 114 could instead include a chain which loops around the output shaft 118 of the motor 105 and the bottom end 112 of the rotatable shaft 106. In yet another embodiment, the transmission assembly 114 could instead include intermeshing gears, or any other suitable rotation transmission components which would allow transmission of rotational movement from the motor 105 to the rotatable shaft 106. In yet another embodiment, the pulverizer 10 may not even include a transmission assembly. The output shaft 118 of the motor 105 could instead be coaxial with the rotatable shaft 106 and secured to the rotatable shaft 106 to directly rotate the rotatable shaft 106.

In the illustrated embodiment, the plurality of pulverizing rotors 108*a*, 108*b*, 108*c* includes an upper pulverizing rotor 108*a* located near the top end 24 of the housing 20, a lower pulverizing rotor 108*b* located near the bottom end 22 of the housing 20 and an intermediate pulverizing rotor 108*c* located between the upper and lower rotors 108*a*, 108*b*. Alternatively, the pulverizing rotor assembly 102 could instead include more or less than three pulverizing rotors.

Still in the illustrated embodiment, the pulverizing rotors 108*a*, 108*b*, 108*c* are spaced away from each other, with the intermediate pulverizing rotor 108*c* being located closer to the lower pulverizing rotor 108*b* than to the upper pulverizing rotor 108*a*. In other words, the intermediate pulverizing rotor 108*c* is spaced from the lower pulverizing rotor 108*b* by a first vertical distance and from the upper pulverizing rotor 108*a* by a second vertical distance which is greater than the first vertical distance. Alternatively, the intermediate pulverizing rotor 108*c* could be positioned closer to the upper pulverizing rotor 108*a* than to the lower pulverizing rotor 108*b*, or could be at equal distance from the upper and lower rotors 108*a*, 108*b*.

Each pulverizing rotor 108*a*, 108*b*, 108*c* includes a rotor hub 120 and a plurality of rotor arms 122 extending outwardly from the rotor hub 120 and towards the housing sidewall 26. The rotatable shaft 106 extends through the rotor hub 120 such that the rotor arms 122 are disposed in a rotation plane R, best shown in FIG. 10B, which extends orthogonally through the central housing axis H. In this configuration, when the rotatable shaft 106 is rotated, the rotor arms 122 therefore remain in the rotation plane R and move along the rotation plane R. Alternatively, instead of all being disposed in a rotation plane, the rotor arms 122 could instead be angled upwardly or downwardly relative to the rotatable shaft 106. In yet another embodiment, the rotor arms 122 could instead be pivotably connected to the rotatable shaft 106 such that the rotor arms 122 could selectively be angled upwardly and downwardly as desired, either manually or automatically using one or more arm actuators.

In the illustrated embodiment, the plurality of airflow deflectors 200 includes six deflectors 200 which are substantially similar to each other and which are substantially evenly spaced from each other in an azimuthal direction (i.e. along a circumference of the housing sidewall 26) around the central housing axis H. Alternatively, all the deflectors 200 may not be similar to each other, may not be spaced from each other evenly and/or the pulverizer 10 may include more or less than six deflectors 202. For example, the pulverizer 10 may include between two and eight deflectors 200.

In the illustrated embodiment, each deflector 200 is elongated and extends substantially parallel to the housing axis H. Specifically, since the housing 20 is positioned such that the central housing axis H extends substantially vertically, the deflectors 200 also extend substantially vertically.

Figure 5:
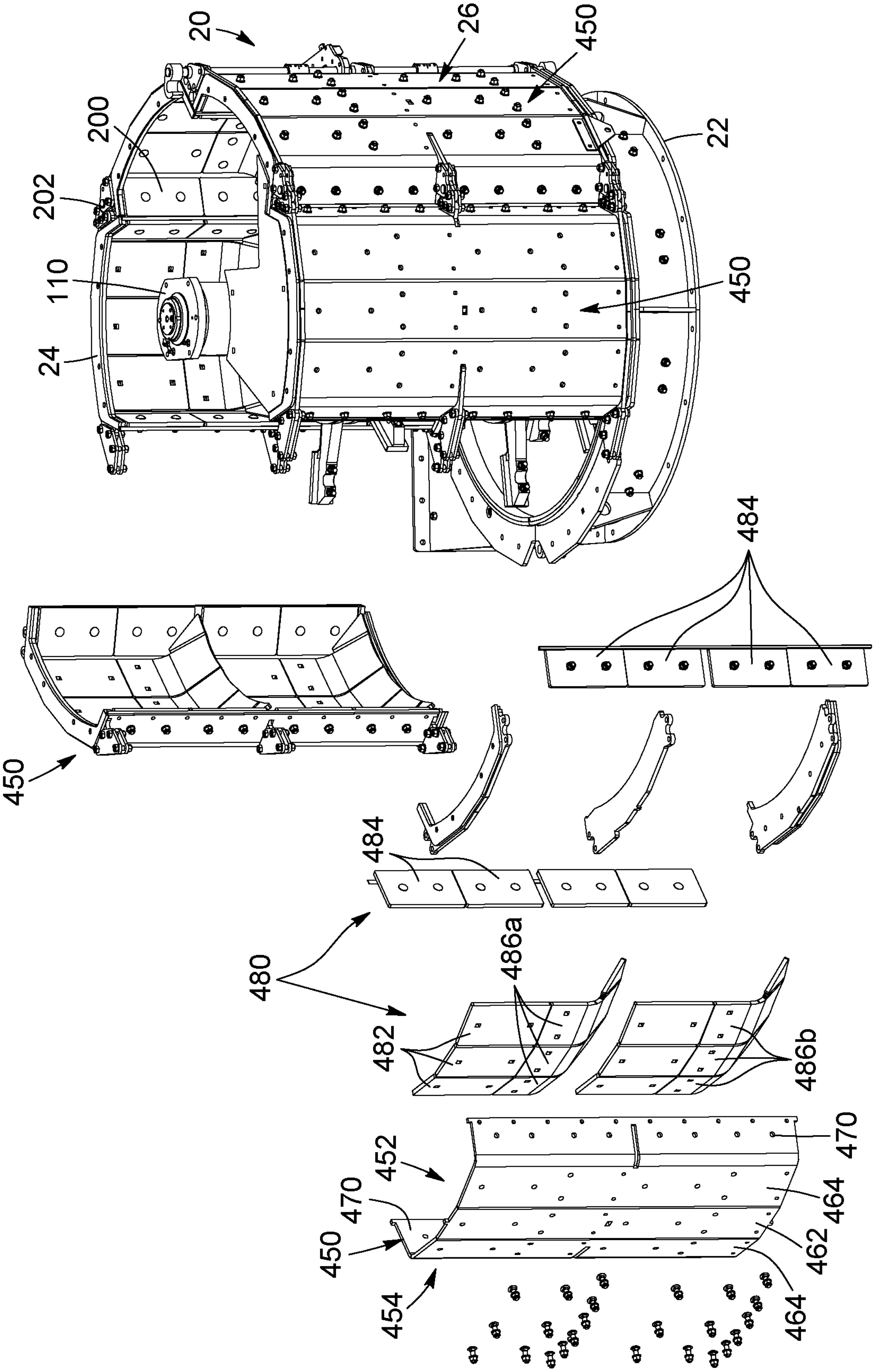
FIG. 5 is a partially exploded view of the housing for the pulverizing apparatus illustrated in FIG. 1.
Figure 6:
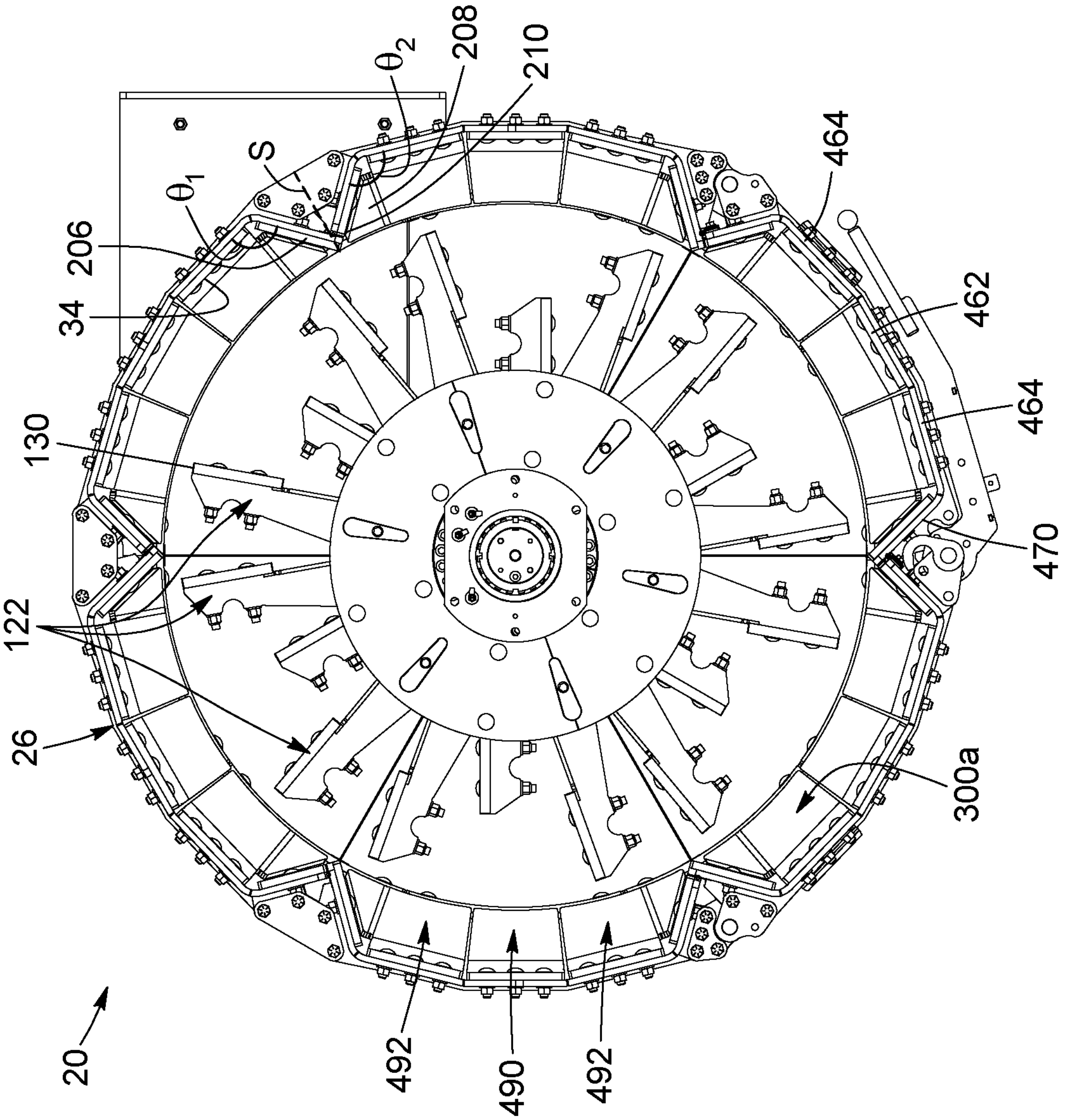
FIG. 6 is a top sectional view of the housing for the pulverizing apparatus illustrated in FIG. 1, showing a plurality of deflectors spaced about the rotatable shaft along the housing sidewall.
Figure 7:
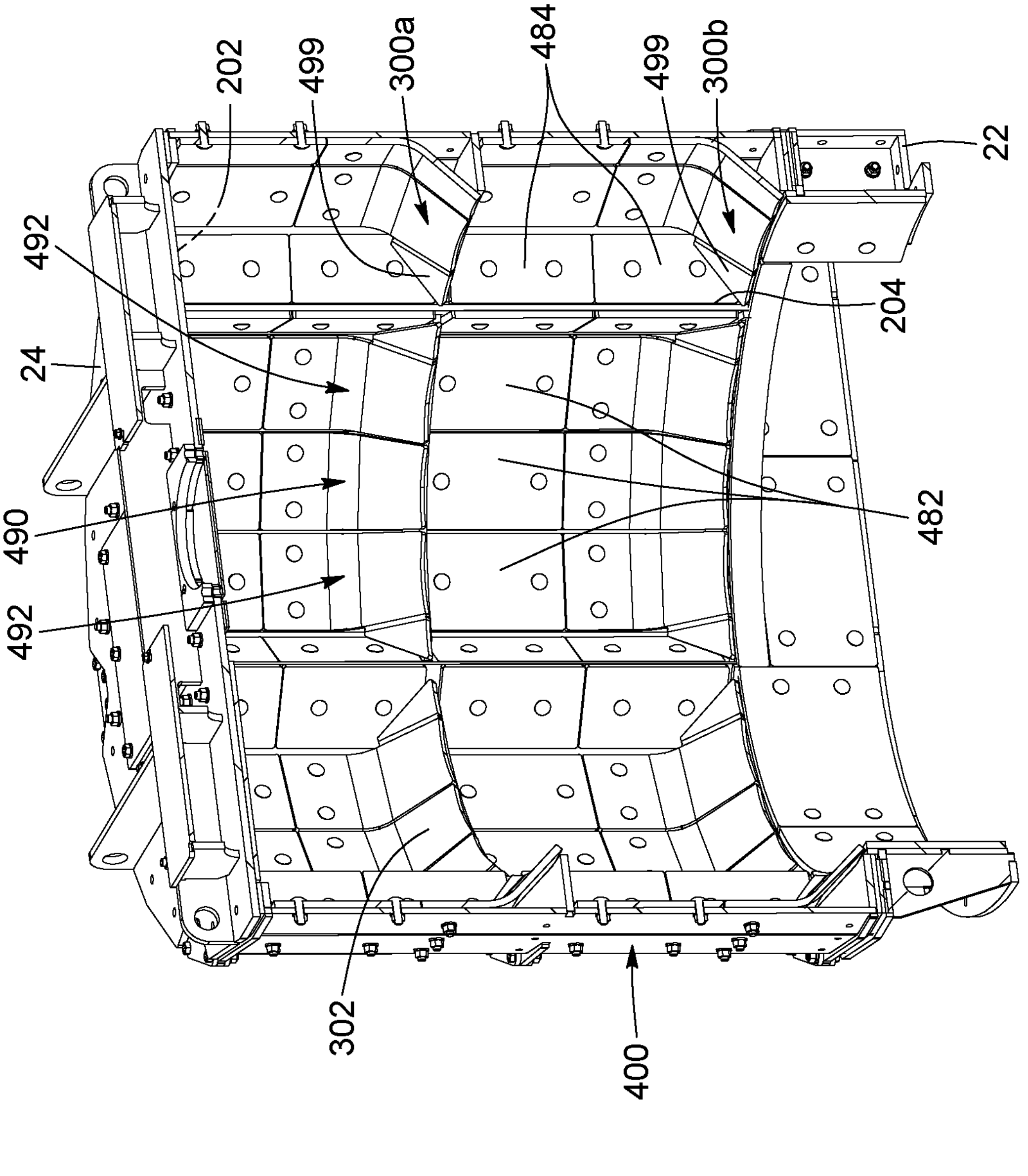
FIG. 7 is a section view of the housing shown in FIG. 4 with the rotatable shaft and rotors removed therefrom, showing shelves positioned along the sidewall at different levels within the housing.

As best shown in FIGS. 5 to 7, each deflector 200 includes a top end 202 located towards the top end 24 of the housing 20 and a bottom end 204 located towards the bottom end 22 of the housing 20. In the illustrated embodiment, each deflector 200 is positioned so as to intersect the rotation plane R of the upper pulverizing rotor 108*a* and of the intermediate pulverizing rotor 108*c*. More specifically, the top end 202 of the deflectors 200 is located above the upper pulverizing rotor 108*a* while the bottom end 204 of the deflectors 200 is located below the intermediate pulverizing rotor 108*c*, and the deflector 200 extends continuously between its top and bottom ends 202, 204.

It will be understood that rotation of the rotor arms 122 will cause the air within the interior chamber 28 to move outwardly towards the housing sidewall 26. In the above configuration, since the deflectors 200 are horizontally aligned with the upper and intermediate pulverizing rotors 108*a*, 108*c*, the air will be moved outwardly by the upper and intermediate pulverizing rotors 108*a*, 108*c* against the deflectors 200 to be deflected by the deflectors 200 to form the vortices V, best shown in FIGS. 8 and 9.

In the illustrated embodiment, each deflector 200 is generally wedge-shaped. Specifically, each deflector 200 has a generally triangular cross-section and includes a flow facing deflecting surface 206 which faces towards the airflow when the rotatable shaft 106 is rotated and an opposite deflecting surface 208 which faces away from the airflow. The flow facing deflecting surface 206 and the opposite deflecting surface 208 extend away from the housing sidewall 26 and converge towards each other to meet at an apex 210 which points towards the housing central axis H. The flow facing deflecting surface 206 is angled relative to an inner face 34 of the housing sidewall 26 at a first deflection angle $\theta_1$ and the opposite deflecting surface 208 is angled relative to the inner face 34 of the housing sidewall 26 at a second deflection angle $\theta_2$.

In the illustrated embodiment, each deflector 200 is symmetrical about a symmetry axis S which extends along a radius of the housing 20. In this embodiment, the first deflection angle $\theta_1$ is therefore substantially equal to the second deflection angle $\theta_2$. In one embodiment, the first and second deflection angles $\theta_1$, $\theta_2$ may be equal to about 1 degree to 89 degrees, and more specifically to about 30 degrees to 60 degrees. Alternatively, the deflector 200 may not be symmetrical and the first and second deflection angles $\theta_1$, $\theta_2$ may be different from each other.

In the illustrated embodiment, the apex 210 of each deflector 200 is spaced radially inwardly from the inner face 34 of the housing sidewall by a radial distance of about 7¾ inches or about 20 cm. Still in the illustrated embodiment, the apex 210 is further spaced radially outwardly from a tip 130 of the rotor arms 122 by a radial distance of between about ½ inch or about 1 cm and about 2 inches or about 5 cm. In one embodiment, the radial distance or "clearance space" between the tip 130 of the rotor arms 122 and the apex 210 may be selected such that the vortices V may be formed as desired when the rotatable shaft 106 is rotated.

Alternatively, the deflectors 200 could be differently shaped and/or sized. For example, the flow facing deflecting surface 206 and the opposite deflecting surface 208 may not be planar, but may instead be curved. In another embodiment, the deflectors 200 may not comprise an opposite deflecting surface 208. In yet another embodiment, instead of being wedge-shaped, the deflectors 200 may instead have a rectangular cross-section, or may have any other shape and size which a skilled person would consider suitable.

Figure 9:
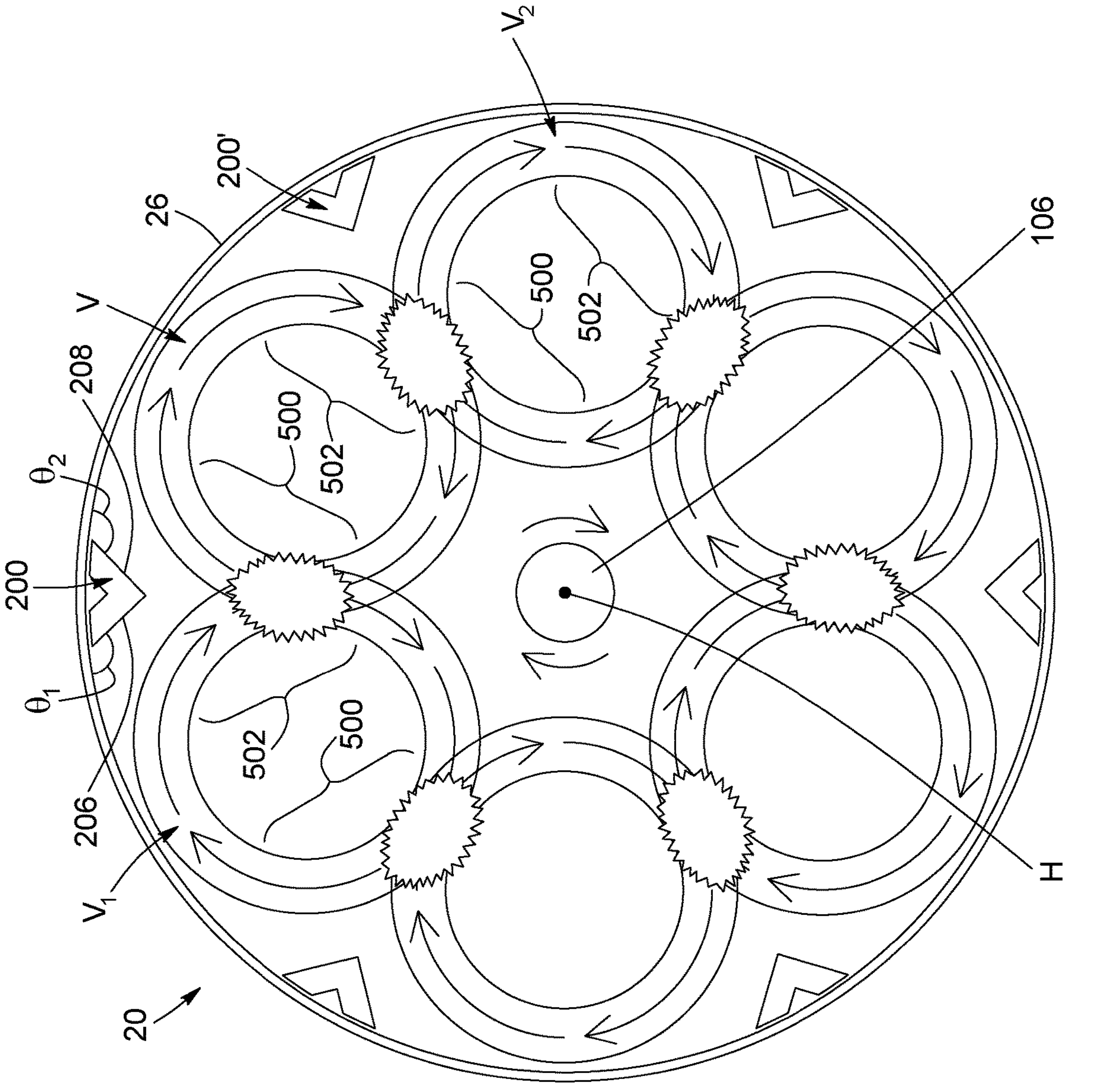
FIG. 9 is a schematic top view of the housing according to an embodiment, showing overlapping vortices within the interior chamber of the housing.

FIG. 9 is a schematic representation of the vortices V generated within the interior chamber 28 when the pulverizer 10 is in operation.

During operation of the pulverizer 10, the rotatable shaft 106 is rotated about the housing axis H such that the rotor arms 122 form the circular airflow revolving about the housing axis H. In the example illustrated in FIG. 9, the rotatable shaft 106 is rotated in a clockwise direction when viewed from above to form a counterclockwise airflow in the interior chamber 28.

The rotatable shaft 106 may be rotated at relatively high speed to provide the desired pulverizing effect in the pulverizer. In one embodiment, the rotatable shaft 106 is rotated at a rotation speed of between about 700 rpm and about 1100 rpm, and more specifically at a rotation speed of between about 1000 rpm and about 1100 rpm. Alternatively, the rotatable shaft 106 may be rotated at a different rotation speed which would allow the formation of the vortices as described below.

The airflow travels generally along the inner face 34 of the housing sidewall 26, but is interrupted by the flow facing deflecting surface 206 of the deflectors 200 which cooperates with the rotor arms 122, and more specifically with the tip of the rotor arms 122 to form the vortices V. As shown in FIG. 9, the vortex V may further be guided back inwardly towards the central housing axis H by an adjacent deflector 200'.

Still referring to FIG. 9, each vortex V further overlaps at least one adjacent vortex $V_1$, $V_2$ to cause input material particles in suspension in the vortex V to collide with input material particles in suspension in the adjacent vortex or vortices $V_1$, $V_2$. More specifically, each vortex V created generally includes an outwardly moving portion 500 defined generally by airflow circulating from the shaft 106 towards the housing sidewall 26 and an inwardly moving portion 502 defined generally by airflow circulating from the housing sidewall 26 towards the shaft 106. As shown in FIG. 9, the outwardly moving portion 500 of each vortex V overlaps the inwardly moving portion 502 of a first adjacent vortex $V_1$, and the inwardly moving portion 502 of each vortex overlaps the outwardly moving portion 500 of a second adjacent vortex $V_2$.

In this configuration, the input material particles in the vortex therefore collide with input material particles moving at twice the movement speed of the particles in the vortex V. For example, in one embodiment, the vortices V, $V_1$, $V_2$ are rotating at about a third of the speed of sound. When input material particles from the first and second adjacent vortices $V_1$, $V_2$ collide with the input material particles in suspension in the vortex V, which move at the same speed but in the opposite direction, the particles will collide with each other at about two-thirds of the speed of sound.

In one embodiment, in addition to the collision of the input material particles via the airflow and vortices V, the input material may further be pulverized by the rotor arms 122 impacting the input material particles in the interior chamber 28 as the rotatable shaft 106 is rotated. In this embodiment, the combined effect of the input material particles impacting each other in the overlapping vortices V, $V_1$, $V_2$ and of the rotor arms 122 impacting the input material particles may increase the efficiency of the pulverizer. Moreover, since the overlapping vortices V cause the particles to impact each other rather than surfaces inside the housing 20, the wear of the components inside the housing 20 may be reduced.

Figure 8:
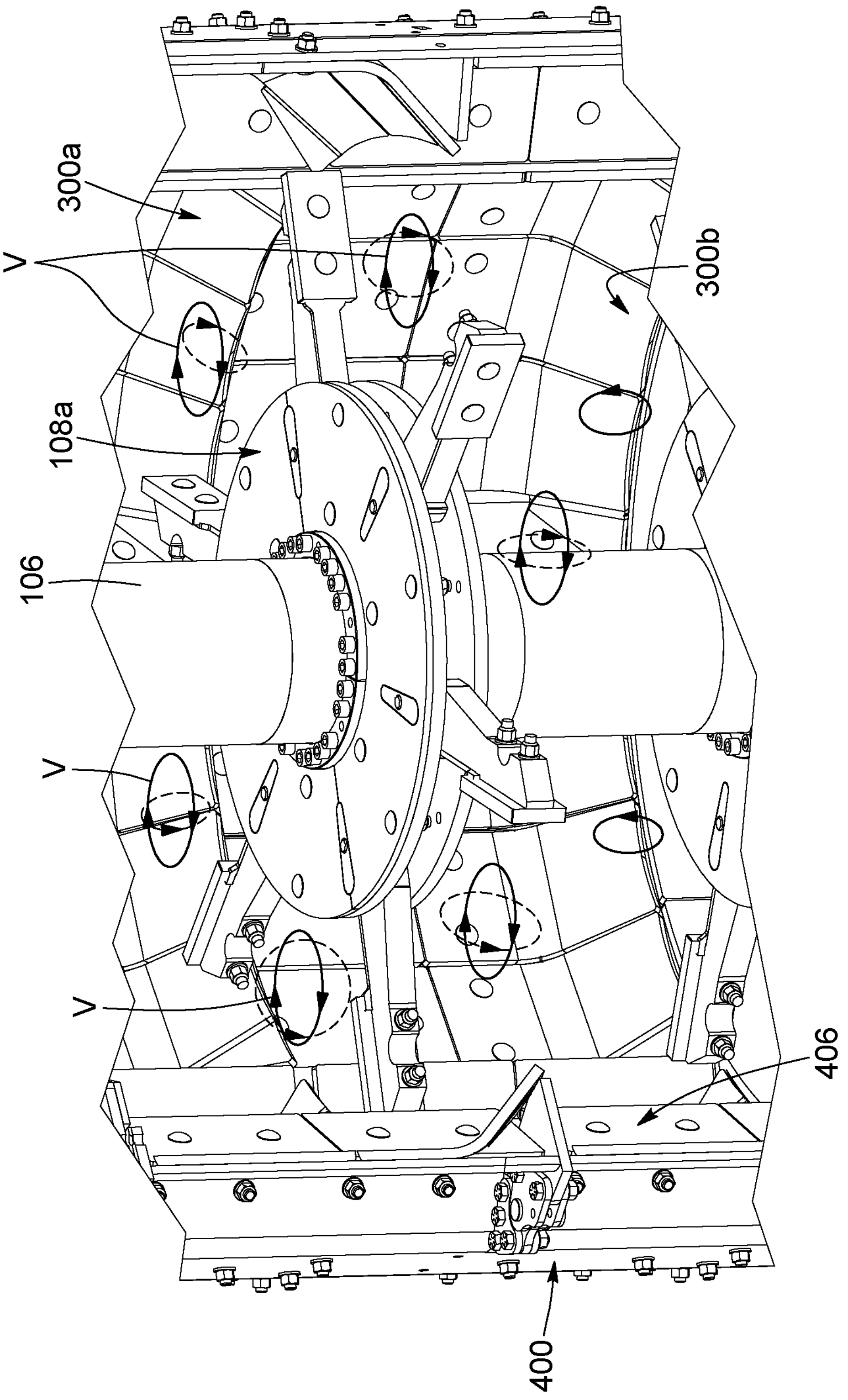
FIG. 8 is a partially sectioned view of a pulverizing rotor mounted within the housing for the pulverizing apparatus illustrated in FIG. 1, showing the vortices created within the housing.

It will be understood that the vortices V illustrated in FIGS. 8 and 9 have been simplified for ease of understanding and that in practice, the vortices V may not be exactly circular as illustrated or be exactly located as indicated in FIG. 9.

In the illustrated embodiment, the pulverizer 10 further includes a plurality of shelves 300*a*, 300*b* which extend inwardly from the housing sidewall 26. Specifically, the plurality of shelves 300*a*, 300*b* includes an upper shelf 300*a* and a lower shelf 300*b* spaced downwardly from the upper shelf 300*a*. Each shelf 300*a*, 300*b* extends circumferentially around the housing axis H and along the housing sidewall 26. It will be understood that the shelves therefore extend substantially orthogonally to the deflectors 200. Specifically, the deflectors 200 extend generally parallel to the housing axis H and can therefor be said to extend in an axial direction relative to the housing 20, while the shelves can be said to extend in an azimuthal direction relative to the housing 20. In the illustrated embodiment, the deflectors 200 extend generally vertically while each shelf 300*a*, 300*b* is disposed in a generally horizontal plane and therefore extend generally horizontally.

Still in the illustrated embodiment, each shelf 300*a*, 300*b* extends substantially continuously around the housing sidewall 26. Alternatively, the shelves 300*a*, 300*b* may not extend continuously around the housing sidewall 26 and could instead includes a plurality of shelf segments spaced from each other to define gaps between adjacent shelf segments.

In the illustrated embodiment, the upper shelf 300*a* is substantially horizontally aligned with the upper pulverizing rotor 108*a* and the lower shelf 300*b* is substantially horizontally aligned with the intermediate pulverizing rotor 108*c*. Alternatively, each shelf 300*a*, 300*b* could be located slightly below the corresponding pulverizing rotor 108*a*, 108*c*.

In the illustrated embodiment, each shelf 300*a*, 300*b* includes a top shelf face 302 which extends downwardly and away from the housing sidewall 26. Specifically, since the shelf 300*a*, 300*b* extends along the housing sidewall 26 and around the housing axis H, the top shelf face 302 is substantially conical. Still in the illustrated embodiment, the top shelf face 302 is angled relative to the housing sidewall 26 at an angle of between about 1 degree, where the top shelf face 302 would be almost flat against the housing sidewall 26, and about 89 degrees, where the top shelf face 302 would be almost orthogonal to the housing axis H. In one embodiment, the top shelf face 302 could be angled relative to the housing sidewall 26 at an angle of between 30 degrees to 60 degrees.

The shelves 300*a*, 300*b* are configured to deflect the airflow directed towards the shelf upwardly. This allows the input material particles to be temporarily maintained in suspension above the shelf 300*a*, 300*b*. The input material particles can therefore be subject to the effect of the vortices and to pulverization by impact with the rotor arms 122 for a longer period of time, resulting in additional reduction in the size of the input material particles as they travel downwardly towards the next rotor stage or towards the outlet 32.

The upward deflection of the airflow may further contribute to the vortices V within the interior chamber 28. More specifically, as shown in FIG. 8, the vortices V may rotate in a plane generally parallel to the housing axis, i.e. upwardly-downwardly, in addition to rotating in a plane orthogonal to the housing axis H as illustrated in FIG. 9. The combined effect of the shelves 300*a*, 300*b* and the deflectors 200 therefore contribute to forming vortices V which are tridimensional such that air within the vortices V moves along a tridimensional path of travel, which may further promote collisions between the input material particles of adjacent, overlapping vortices V.

This configuration further allows the number of vortices V generated by the deflectors 200 to be multiplied by the number of shelves 300*a*, 300*b* in the housing 20. For example, in the illustrated embodiment, the pulverizer 10 includes six deflectors 200 which can form six vortices above each shelf 300*a*, 300*b*, for a total of 12 vortices in the entire interior chamber 28.

In the embodiment illustrated in FIG. 1, the housing sidewall 26 includes an outer structural wall 400 having an inner face 402 and an outer face 404 and a housing liner 406 extending over the inner face 402 of the outer structural wall 400. The housing liner 402 is used to protect the outer structural wall 400 from the impact of input material particles inside the interior chamber 28.

In the illustrated embodiment, the outer structural wall 400 is not made of a single, unitary cylindrical body, but instead includes a plurality of wall sections 450 which extend substantially between the top and bottom ends 24, 22 of the housing 20 and which are disposed side-by-side to form the outer structural wall 400.

Specifically, each wall section 400 has a concave inner face 452 facing towards the interior chamber 28 and a convex outer face 454 which faces away from the concave inner face 452. As best shown in FIG. 5, each wall section 400 comprises a plurality of planar portions 462, 464 disposed adjacent each other and angled relative each other to define the concave inner face 452. In the illustrated embodiment, the plurality of planar portions 462, 464 include a central planar portion 462 and a pair of lateral planar portions 464 extending on either side of the central planar portion 462.

In the illustrated embodiment, the outer structural wall 400 includes six wall sections 450 and the planar portions 462, 464 of each wall section 400 are angled relative to each other at an angle of about between about 10 degrees and 30 degrees. Alternatively, the planar portions 462, 464 may be angled at an angle of less than 10 degrees or more than 30 degrees, in which case the outer structural wall 400 may include more or less than six wall sections 450 to form the entire outer structural wall 400.

In the illustrated embodiment, each wall section 450 further including a pair of side flanges 470. Each side flange 470 extends laterally from a corresponding lateral planar portion 464 of the wall section 450 and further extends away from the concave inner face 452. Specifically, each side flange 470 is angled relative to the corresponding lateral planar portion 464 at an angle which is substantially greater than the angle between the lateral planar portion 464 and the corresponding central planar portion 462. In the illustrated embodiment, each side flange 470 is angled relative to the corresponding lateral planar portion 464 at an angle of between about 30 degrees and 89 degrees. Alternatively, the side flanges 470 may be angled relative to the corresponding lateral planar portion 464 at an angle of less than 30 degrees or of more than 89 degrees.

As best shown in FIG. 6, when the wall sections 450 are disposed side-by-side to form the outer structural wall 400, the side flange 470 therefore extend inwardly into the interior chamber 28. In the illustrated embodiment, each side flange 470 of the wall section 450 extends adjacent a corresponding side flange 470 of an adjacent wall section 450 to define, together with the corresponding side flange 470, a corresponding one of the deflectors 200. This configuration eliminates the need to provide the deflectors 200 as separate pieces which would then need to be secured to the inner face 34 of the housing sidewall 26. Moreover, this configuration eliminates the risk that the deflectors 200 may become unsecured from the housing sidewall 26 during operation of the pulverizer 10 and therefore allows the deflectors 200 to better resist the forces inside the interior chamber 28. It will be understood that the wall sections 450 could be configured differently than described above. For example, instead of extending continuously from the top end 24 to the bottom end 22 of the housing 20, the wall sections 450 could instead include a plurality of wall subsections which may be substantially stacked vertically from the bottom end 22 of the housing 20 to the top end 24 to form the wall sections 450.

It will be appreciated that providing the housing sidewall 26 as a single, continuous cylinder-shaped piece, especially of a size appropriate for pulverizing material, could prove to be expensive. By providing the housing 20 in multiple planar pieces which can be easily manufactured and assembled together, the present configuration may reduce the costs of manufacturing the housing 20. Moreover, this configuration may facilitate the maintenance of the pulverizer 10, since each wall section 450 could be removed individually from the other wall sections 450 to allow access into the housing 20.

Figure 23:
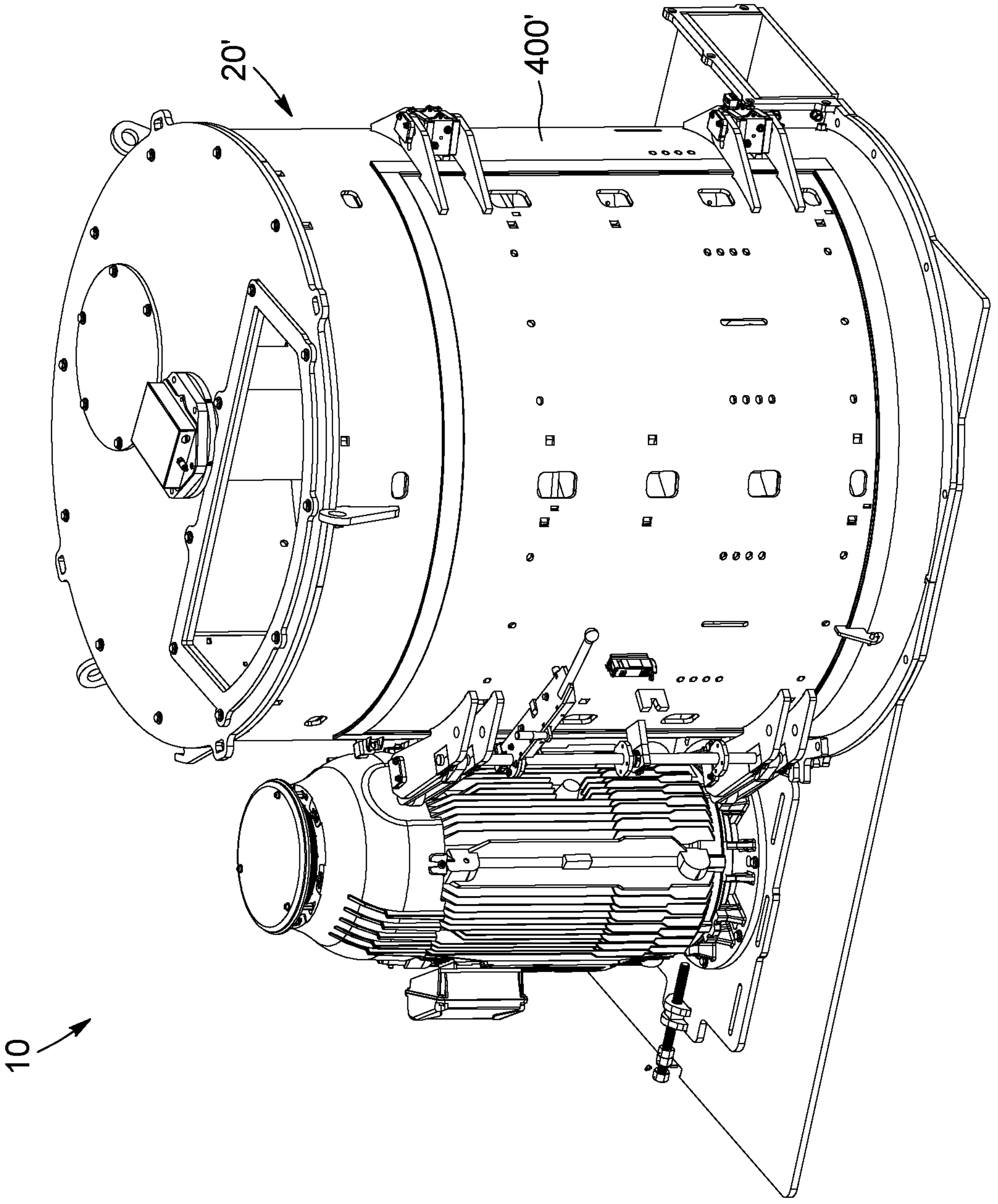
FIG. 23 is a perspective view of an alternative embodiment of the pulverizing apparatus.

Referring to FIG. 23, there is shown the pulverizer 10 with a housing 20', in accordance with another embodiment. In this embodiment, the housing 20' includes an outer structural wall 400' which is made of a single, continuous piece of material which has been shaped in the shape of a cylinder, instead of being made using multiple wall sections 450.

Referring back to FIGS. 5 to 7, the housing liner 406 includes a plurality of housing liner portions 480 attached to and extending along the outer structural wall 400.

Specifically, each housing liner portion 480 is detachable from the outer structural wall 400 independently from the other housing liner portions 480. This allows each housing liner portion 480 to be detached to be serviced or replaced without requiring the entire housing liner 406 to be removed.

In the illustrated embodiment, each housing liner portion 480 are attached to the outer structural wall 400 using at least one fastener. The at least one fastener could include bolts, rivets, screws, or any other type of fasteners that a skilled person would consider to be suitable.

In the illustrated embodiment, the plurality of housing liner portions 480 includes a plurality of sidewall liner panels 482 which extend against the planar portions 462, 464 of the wall sections 400. Specifically, the sidewall liner panels 482 are generally rectangular and have a width which generally correspond to the width of the planar portions 462, 464 of the wall sections 400. The sidewall liner panels 482 are further generally planar so as to extend flat against the corresponding planar portions 462, 464 of the wall sections 400 to which they are attached.

In the illustrated embodiment, the plurality of housing liner portions 480 further includes a plurality of deflector liner panels 484 which extend against the flow facing deflecting surface 206 and the opposite deflecting surface 208. Specifically, since the flow facing deflecting surface 206 and the opposite deflecting surface 208 are substantially planar in the illustrated embodiment, the deflector liner panels 484 are also substantially planar so as to extend flat against the corresponding deflecting surface 206, 208 to which they are attached.

Still in the illustrated embodiment, the plurality of housing liner portions 480 further includes a plurality of shelf liner panels 486*a*, 486*b* which are disposed side-by-side against the housing sidewall 26 to form the shelves 300*a*, 300*b*. Specifically, the plurality of shelf liner panels 486*a*, 486*b* includes a first set of shelf liner panels 486*a* which are disposed side-by-side in a substantially horizontal row to form the upper shelf 300*a* and a second set of shelf liner panels 486*b* which are disposed side-by-side in a substantially horizontal row to form the lower shelf 300*b*.

It will be appreciated that providing the shelves 300*a*, 300*b* in multiple, distinct portions which are detachable from each other allows only parts of the shelves 300*a*, 300*b* to be detached to be serviced or replaced without requiring the entire shelves 300*a*, 300*b* to be removed.

In the illustrated embodiment, the plurality of shelf liner panels 486*a*, 486*b* further includes a plurality of central lateral shelf liner panels 490 configured to be disposed against the central planar portion 462 of a corresponding wall section 450 and a plurality of lateral shelf liner panels 492 configured to be disposed against the lateral planar portions 464 of the corresponding wall section 450, on either side of the central planar portion 462.

Figure 10A:
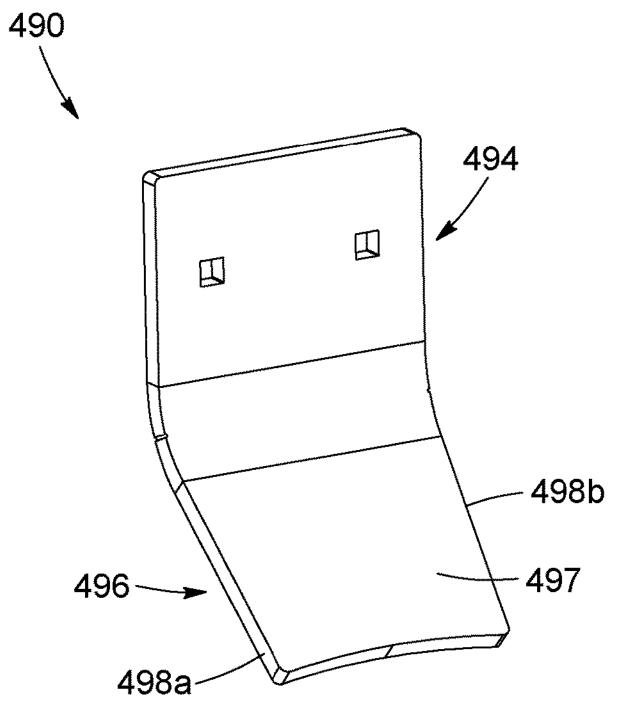
FIG. 10A is a perspective view of a shelf liner portion for the pulverizing apparatus illustrated in FIG. 1, in accordance with one embodiment.
Figure 10B:
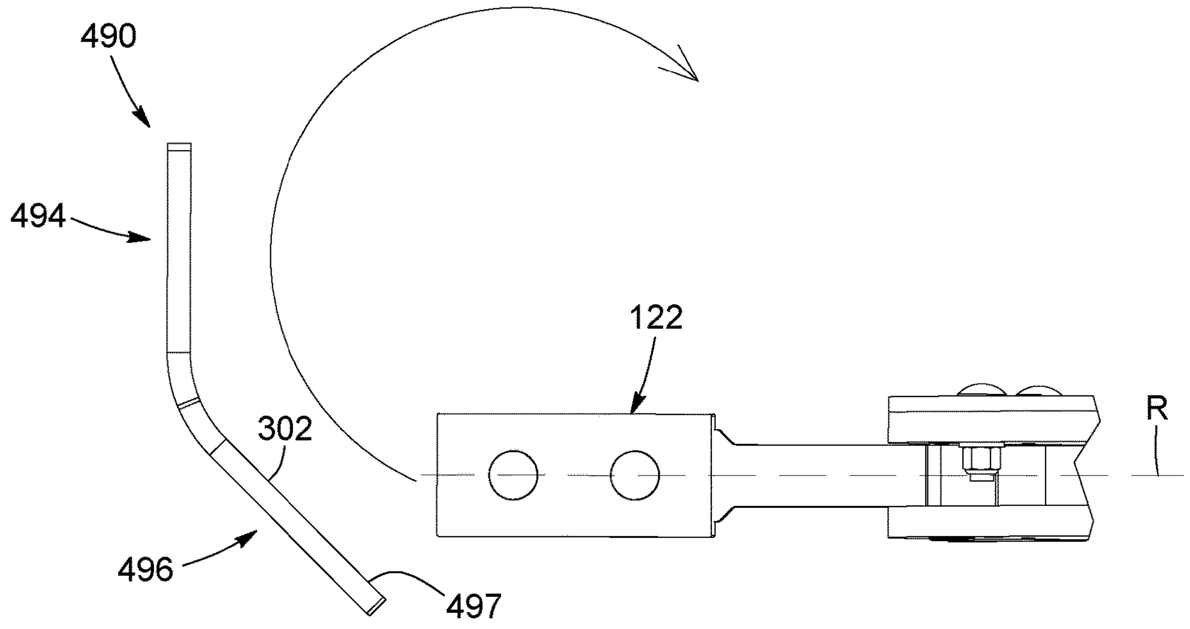
FIG. 10B is a side elevation view of the shelf liner portion shown in FIG. 10A, with a rotor arm spaced from the shelf section.

As shown in FIG. 10A, each central shelf liner panel 490 includes an upper planar portion 494 configured to extend along the central planar portion 462 of the corresponding wall section 450 and a lower angled portion 496 which is angled relative to the upper planar portion 494. The lower angled portion 496 includes a top face 497 which, along with the top faces 497 of the other shelf liner panel 490, 492 in the corresponding set of shelf liner panels 486*a*, 486*b*, define the top shelf face 302 of the corresponding shelf 300*a*, 300*b*. The lower angled portion 496 further includes a pair of lateral edges 498*a*, 498*b* which taper towards each other as they extend away from the upper planar portion 494.

As shown in FIG. 7, each lateral shelf liner panel 492 is further located adjacent one of the deflectors 200. Each lateral shelf liner panel 492 is generally similar to the central shelf liner panels 490, except that the lateral shelf liner panel 492 further includes a substantially triangular wing portion 499 which extends laterally from the lower angled portion 496 to abut the adjacent deflector 200 and thereby bridges the gap between the lower angled portion 496 and the adjacent deflector 200.

In some embodiments, the housing liner 406 could be made of fiberglass, high-density polyethylene (HDPE), ceramic, steel, or any other such material that a skilled person may consider to be appropriate. Additionally, at least some of the housing liner portions 480 could be covered by an overlay, such as a chromium carbide overlay, a carbide overlay or the like, which would provide further wear resistance to the housing liner 406. For example, the flow facing deflecting surface 206 of the deflectors 200 could be covered by such an overlay to further prevent wear on the deflectors 200.

Figure 11A:
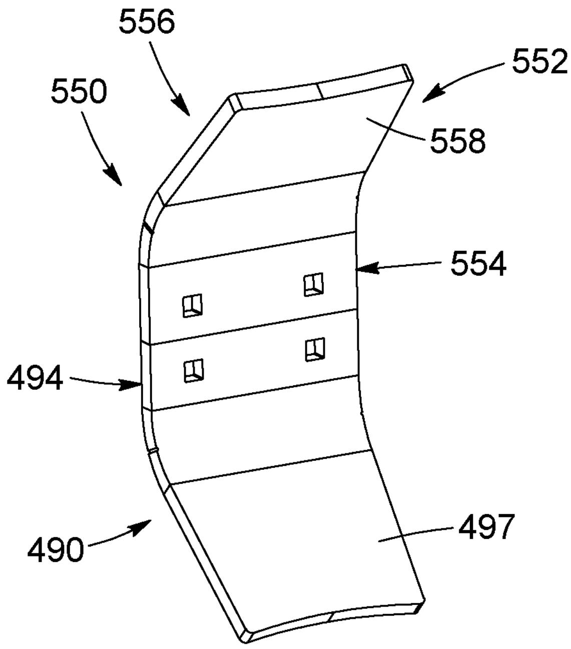
FIG. 11A is a perspective view of a shelf liner portion for the pulverizing apparatus illustrated in FIG. 1, in accordance with another embodiment, showing a pair of shelf sections as seen in FIG. 10A connected together.
Figure 11B:
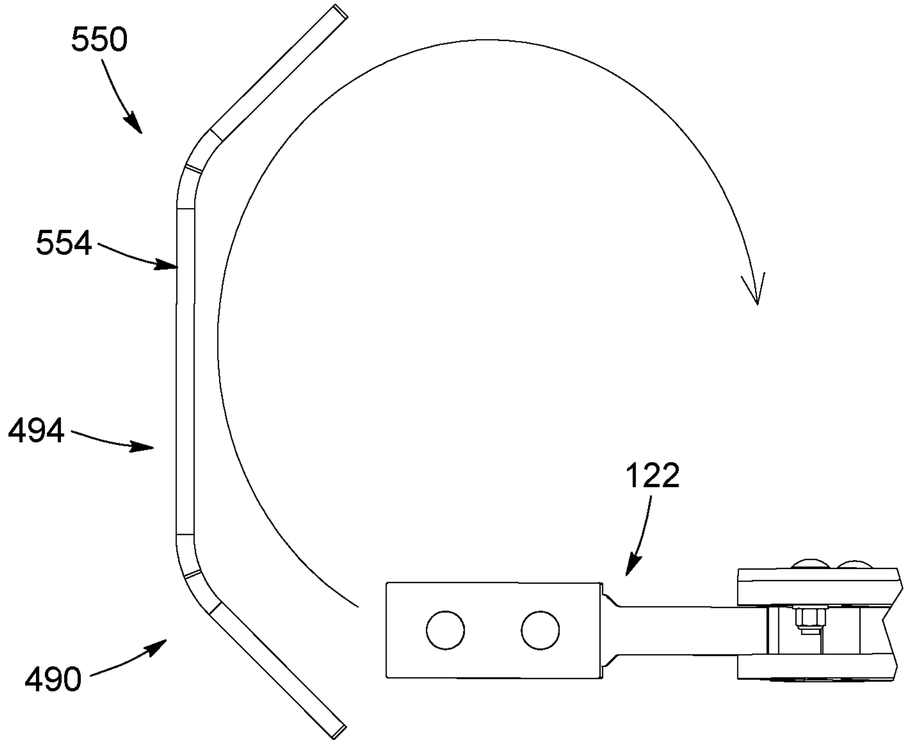
FIG. 11B is a side elevation view of the shelf liner portion shown in FIG. 11A, with a rotor arm spaced from the shelf liner portion.
Figure 12:
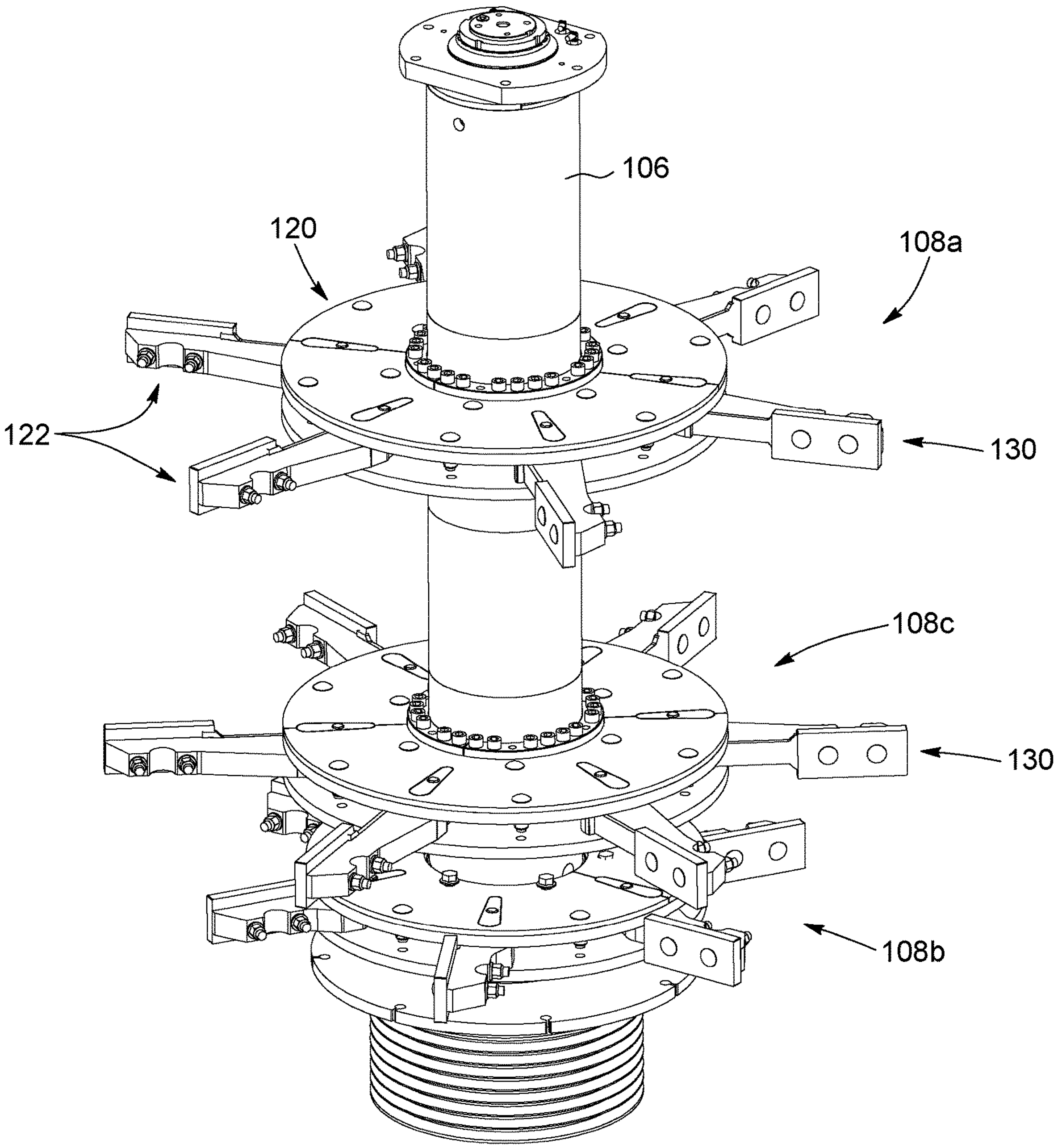
FIG. 12 is a perspective view of a pulverizing rotor assembly according to an embodiment, showing three rotors vertically spaced therealong.

Turning to FIGS. 11A and 11B, there is shown another embodiment in which, in addition to the plurality of shelf liner panels 486*a*, 486*b*, the plurality of housing liner portions 480 could further includes a plurality of downward facing panels 550 disposed side-by-side and defining a downward facing horizontal deflector 552 above each shelf 300*a*, 300*b*. Specifically, each downward facing panel 550 is a mirror image of a corresponding shelf liner panels 486*a*, 486*b* and includes a lower planar portion 554 and an upper angled portion 556 which is angled relative to the lower planar portion 554. Specifically, the upper angled portion 556 includes a bottom surface 558 which faces generally downwardly. This configuration may contribute to further deflecting the airflow into tridimensional vortices in which the airflow moves in the vertical direction, as shown in FIG. 11B. Alternatively, the downward facing panel 550 and the corresponding shelf liner panels 486*a*, 486*b* could be provided as a single, unitary piece instead of being provided as two separate pieces.

Referring back to FIG. 6, it is appreciated that the rotor arms 122 of a given pulverizing rotor 108 can be angularly offset around the rotatable shaft with respect to the rotor arms 122 of the other pulverizing rotors 108. As such, the vortices created by the arms of the upper pulverizing rotor

108*a* would not be vertically aligned with the vortices created by the intermediate or lower pulverizing rotors 108*b*, 108*c*. This configuration can reduce the chance of material passing through the pulverizer un-impacted. For example, if material manages to get through the upper rotor arms un-impacted (e.g., without getting dragged into a vortex), then the vortices created below the upper level are more likely to interact with the material and effectively pulverize it.

Figure 13:
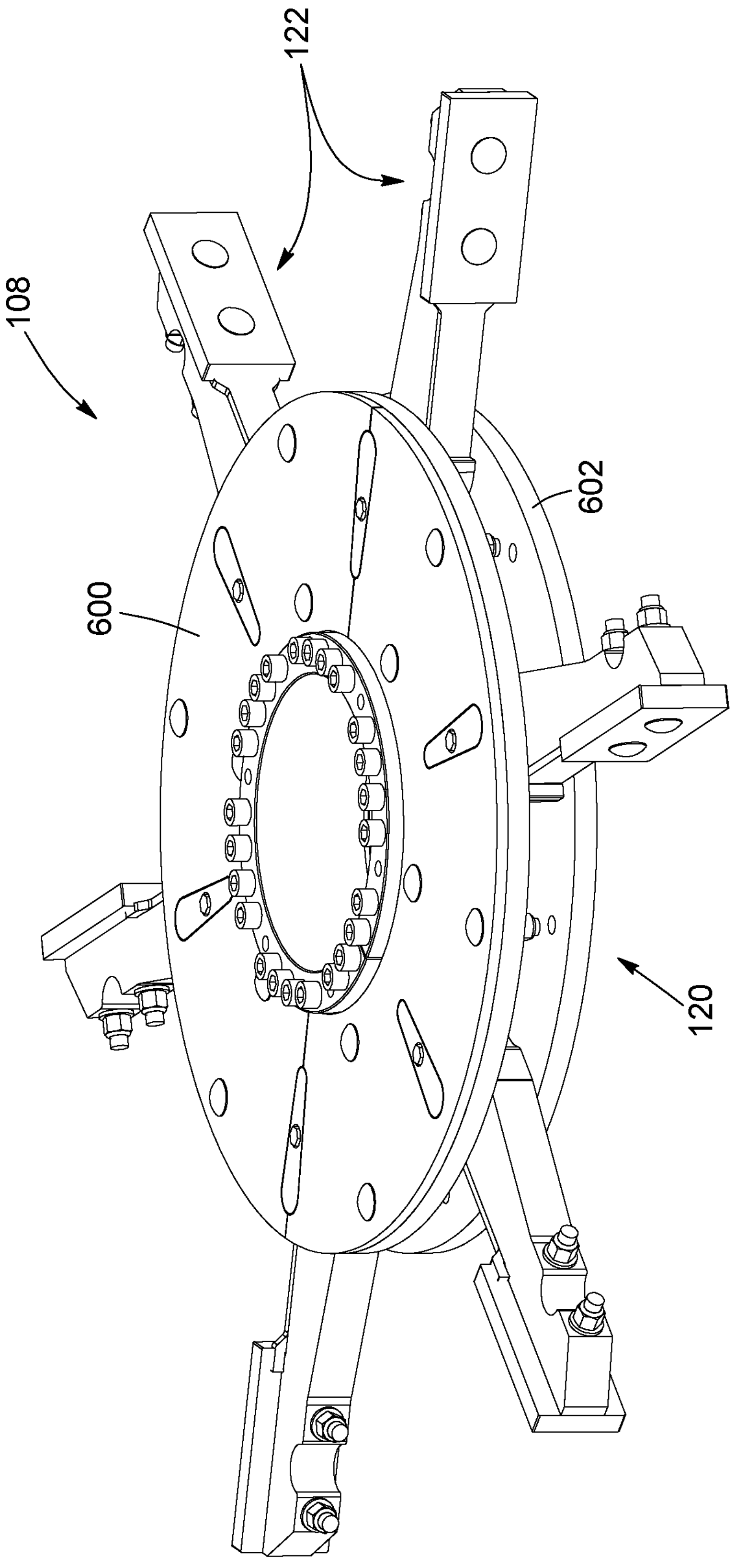
FIG. 13 is a perspective view of a pulverizing rotor shown in FIG. 12, according to an embodiment.
Figure 14:
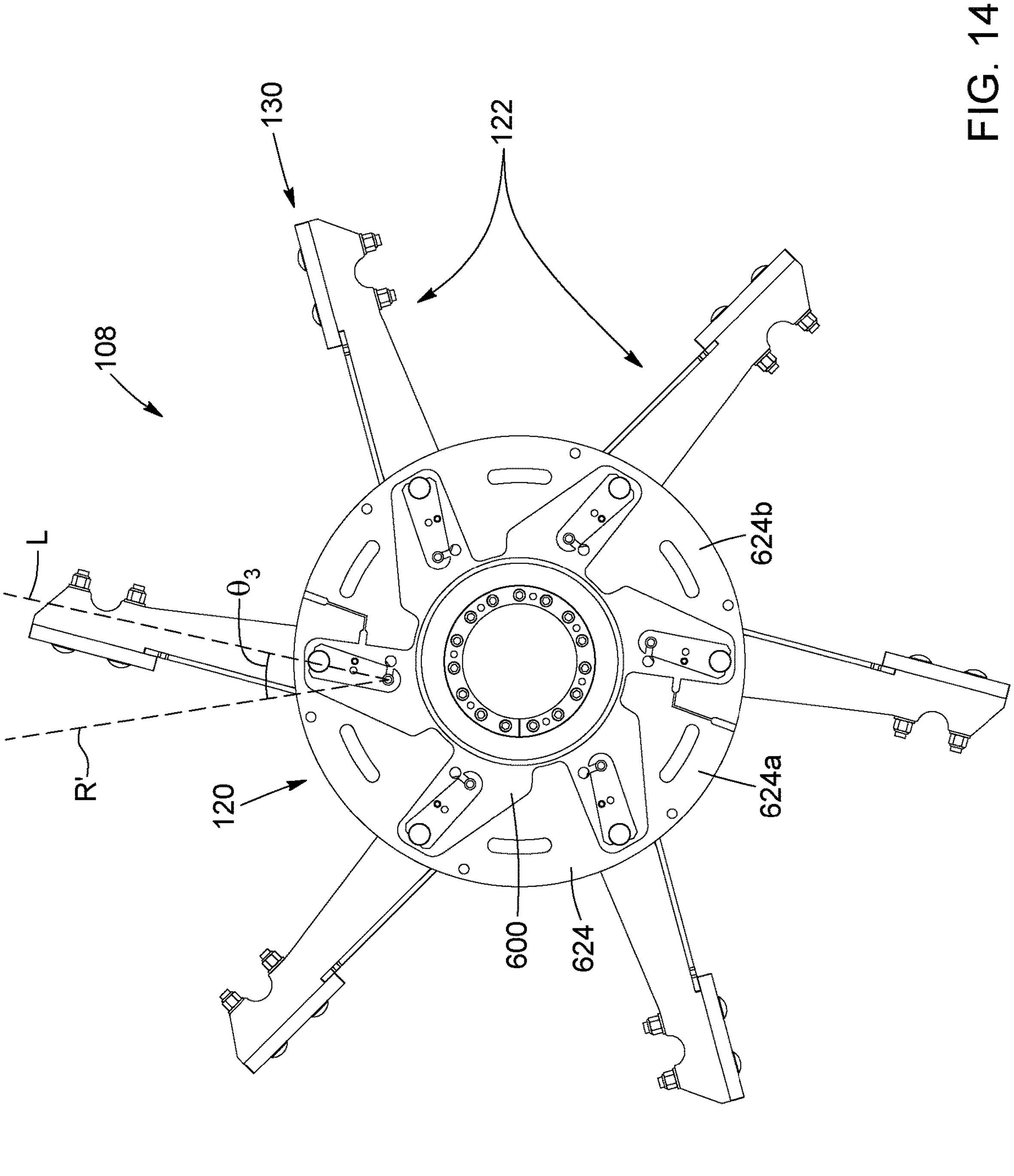
FIG. 14 is top view of a rotor according to an alternative embodiment, showing the rotor arms being canted around a central hub.
Figure 15:
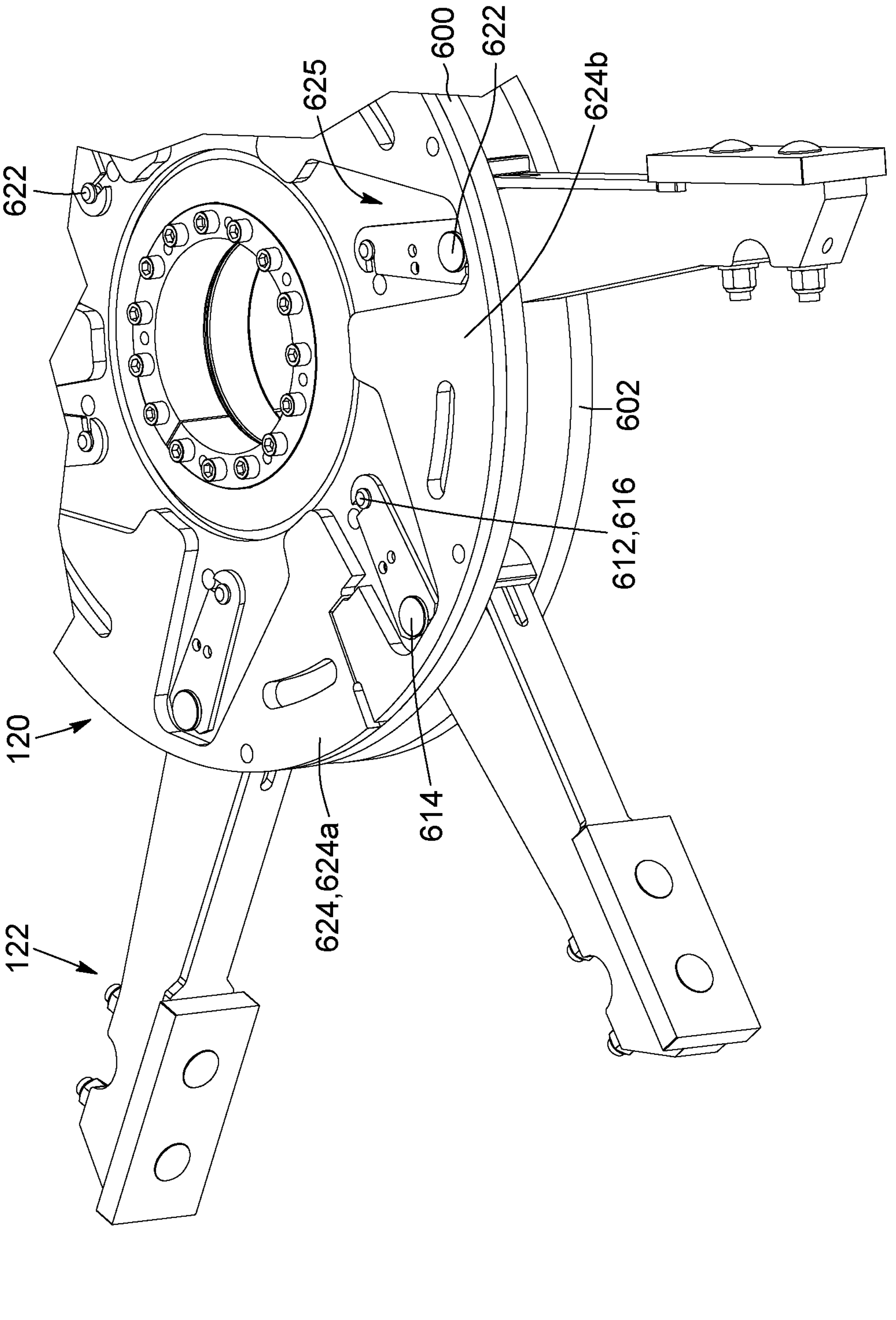
FIG. 15 is a sectioned perspective view of the rotor shown in FIG. 14, showing rotor arms connected to the hub via respective connectors.

With reference to FIGS. 13 to 15, possible embodiments of a single pulverizing rotor 108, and corresponding components, will now be described. It should be noted that the plurality of rotor arms 122 are substantially evenly spaced about the rotor hub 120 and the rotatable shaft for creating multiple vortices similarly spaced about the rotatable shaft within the interior chamber. The angle spacing the arms around the rotor hub 120 can depend on the number of arms 122 connected to said hub (e.g., in order to have the rotor arms evenly spaced 360 degrees around the rotatable shaft). For example, the rotor arms can be spaced by about 90 degrees for a rotor hub having four rotor arms, or by about 60 degrees for a rotor hub having six rotor arms connected thereto. However, it is appreciated that the rotor arms 122 can be connected to the rotor hubs 120 at any suitable location, with any suitable angle in-between.

In some embodiments, the rotor hub 120 can include one or more plates to which the rotor arms 122 can be connected. In this embodiment, the rotor hub 120 includes a top plate 600 and a bottom plate 602 spaced from one another and between which the rotor arms 122 are connected. More specifically, the rotor arms 122 can include a proximal portion 122*a* (best seen in FIG. 16A) sandwiched between the top and bottom plates 600, 602, and a distal portion 122*b* extending from the hub into the interior chamber. Referring back to FIG. 12, the arms of each hub can extend outwardly by about the same distance, although it is appreciated that other configurations are possible. For example, in this embodiment, the arms of the lower pulverizing rotor 108*b* are shorter than those of the intermediate or upper pulverizing rotors 108*a*, 108*c*. The housing sidewall 26 can similarly have a shorter diameter around the lower pulverizing rotor 108*b*, such that the distance between the housing sidewall, or more specifically the apex of the deflectors, and the tip 130 of the rotor arms 122 remain generally the same.

The rotor arms 122 can be connected between the top and bottom plates 600, 602 via one or more connectors extending through the arms and at least one of the hub plates, as will be further described below. It is noted that the plates of the rotor hubs are preferably circular in order to promote aerodynamics during operation of the pulverizer (i.e., during rotation of the rotatable shaft, rotor hubs and rotor arms). However, it is appreciated that other shapes and configurations are possible, such as hub plates having any suitable polygonal shape, or top and bottom plates having different shapes from one another.

It should be noted that the rotor arms 122 can extend into the interior chamber substantially radially (e.g., with respect to the rotatable shaft) or with an angle. In the illustrated embodiment of FIG. 14, the rotor arms 122 are tilted, or canted, relative to the rotor hub 120, whereby an angle is defined between a longitudinal axis L of the rotor arms and a corresponding axis R' extending radially outwardly from the hub 120 at a proximal end of the rotor arm. This configuration can facilitate the creation of vortices within the interior chamber as the generation of flow currents moving outwardly along respective longitudinal axis of each arm is promoted. Moreover, the canted rotor arms 122 can prevent, or at least reduce, material wrapping around the rotor arms 122 during rotation thereof. In the illustrated embodiment, the rotor arms 122 can be canted such as to define a canting angle $\theta_3$ between about 5 degrees and about 90 degrees, such as a canting angle $\theta_3$ between about 20 degrees and 60 degrees. It is appreciated that the expression "canting angle" refers to the angle defined between the longitudinal axis of any given rotor arm and the radial axis of the hub extending through the proximal end of the that same rotor arm.

Figure 16A:
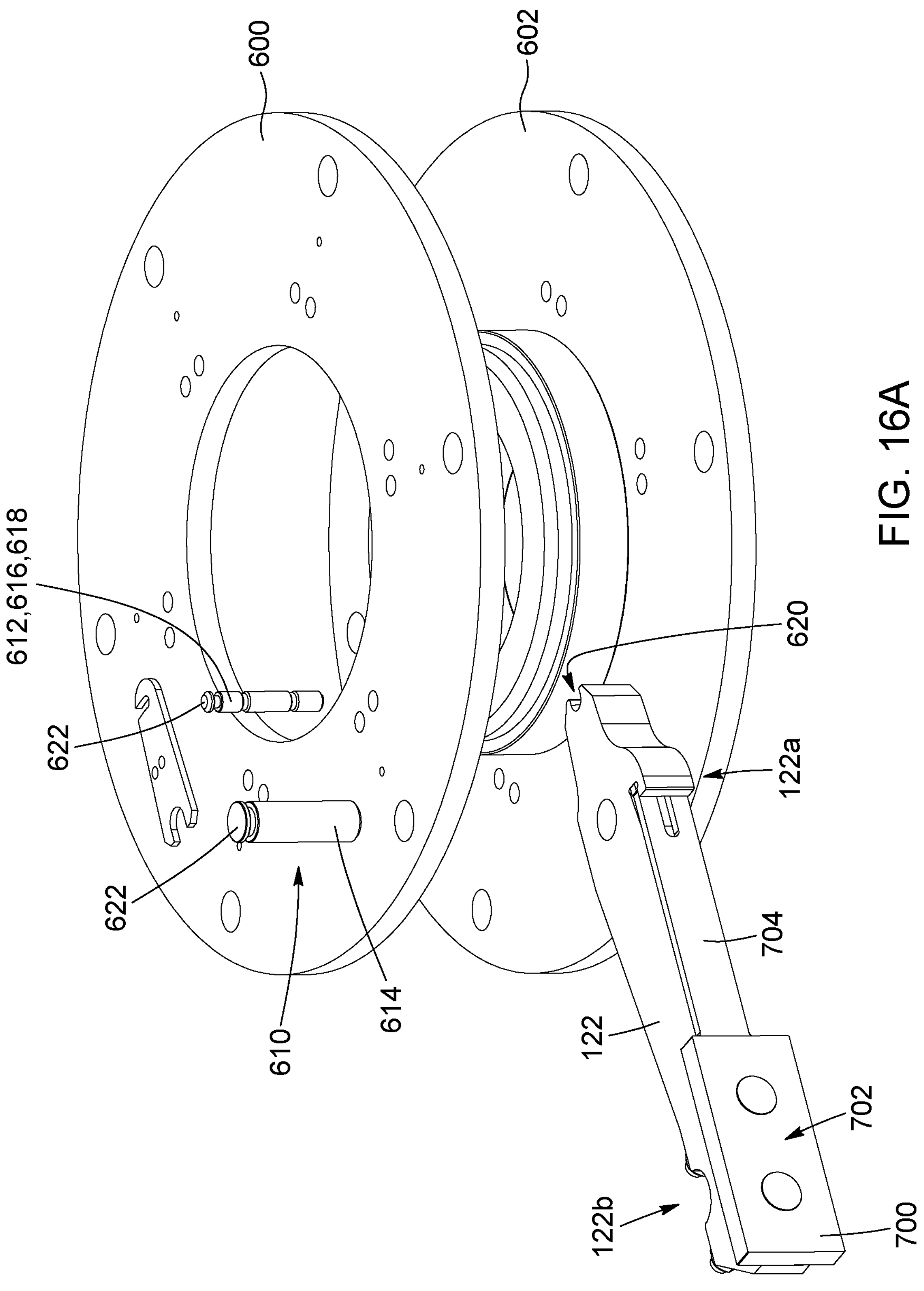
FIG. 16A is an exploded view of rotor shown in FIG. 14, showing the connectors used for connecting a single arm to the hub, according to an embodiment.
Figure 16C:
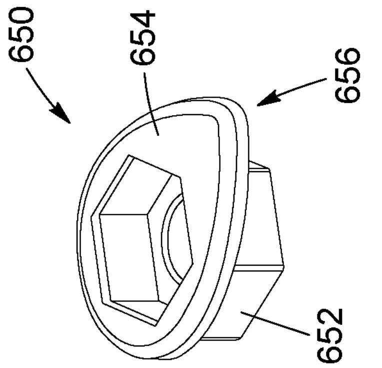
FIG. 16C is a perspective view of the bolt protector illustrated in FIG. 16B.
Figure 16E:
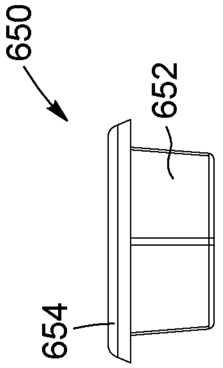
FIG. 16E is a side elevation view of the bolt protector illustrated in FIG. 16B.
Figure 16B:
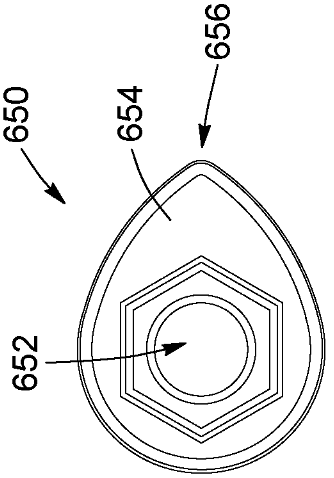
FIG. 16B is a top plan view of a bolt protector for the pulverizer illustrated in FIG. 1.
Figure 16D:
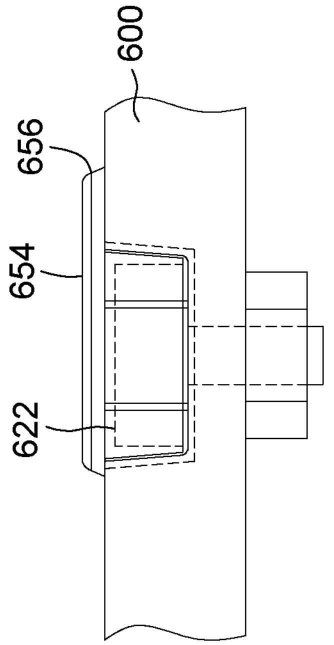
FIG. 16D is a side elevation view of the bolt protector illustrated in FIG. 16B, with the bolt protector mounted on a bolt.

Now referring to FIGS. 15 and 16A, in addition to FIG. 14, the hub can be provided with safety features configured to protect the components of the pulverizer, such as the rotor arms, the rotor hubs, the rotatable shaft, the housing, the deflectors and/or the shelves, among others. In the present embodiment, each rotor hub 120 is provided with a release mechanism 610 configured to allow the rotor arms 122 to move if a force of a predetermined magnitude is applied thereon (i.e., if a force threshold is reached). For example, if large, dense, hard or otherwise unsuitable material is introduced in the pulverizer, the release mechanism 610 is adapted to allow the rotor arms to move so as to prevent damage to the rotor arms.

In some embodiments, the rotor arms 122 can be operated between a first position, such as the aforementioned canted position, and a second position upon the application of the predetermined force. It should be understood that the canted angle $\theta_3$ when in the second position differs from the canted angle $\theta_3$ when in the first position. More specifically, the rotor arms 122 can be allowed to rotate about a point when the predetermined force is applied thereon in order to avoid, or at least partially reduce, damage to the rotor arm and/or rotor hub. It is noted that the release mechanism 610 can be adapted to allow movement of each rotor arm independently from one another, although other configurations are possible, such as allowing movement of two or more rotor arms simultaneously.

In this embodiment, the release mechanism 610 includes a mechanical fuse 612 for each rotor arm 122 shaped and configured to retain the rotor arm in the first position, and release the rotor arm upon application of the predetermined force thereon. As mentioned above, the rotor arms 122 are connected between the top and bottom plates 600, 602 via connectors extending therethrough (i.e., through the arms and at least one of the plates). In the present embodiment, the connectors include a first connector 614 and a second connector 616 spaced along the rotor arm and extending through the rotor arm and both of the top and bottom plates 600, 602. The rotor arm illustratively includes a proximal recess 620, at the proximal end thereof 122*a*, adapted to receive the second connector 616, with the first connector 614 being spaced therefrom along the rotor arm.

In this embodiment, the second connector 616 acts as the mechanical fuse 612, and the first connector 614 can include a bolt which acts as the pivot point. In other words, the rotor arm 122 is allowed to pivot about the first connector 614 once the mechanical fuse 612 releases the rotor arm. In an exemplary embodiment, the mechanical fuse (i.e. the second connector) is a shear pin 618 configured to break once a force threshold on the rotor arm 122 is reached. It is appreciated that the shear pin 618 generally has a smaller diameter than the first connector 614 since the shear pin 614 is configured to collapse prior to damages occurring to the rotor arms or surrounding components. As such, the predetermined force, or threshold, can be about half of the shear failure of the rotor arms, although any other suitable threshold is possible.

The high speeds of the vortices within the interior chamber can increase wear or deterioration of the inner components (e.g., panels, arms, hubs, various connection elements, etc.) which can require replacing in order to prevent breaks or additional damage. As seen in FIG. 15, the first and second connectors 614, 616 of the release mechanism can have a portion thereof (e.g., bolt heads 622) extending above, or resting on the top plate 600 of the rotor hub 120. The rotor hubs can thus be provided with an additional safety feature adapted to protect the bolt heads 622 from wear.

In this embodiment, the rotor hub includes a coverplate 624 mounted to the top plate 600 being shaped and sized to at least partially surround the bolt heads 622 of each connector of the release mechanism. More particularly, the coverplate 624 has a plurality of recesses 625 for respectively receiving a pair of first and second connector bolt heads 622. Furthermore, the coverplate 624 has a thickness generally greater than that of the bolt heads 622 such that the bolt heads 622 are niched in the recesses 625 of the coverplate 624, allowing flow currents to flow generally above the bolt heads 622, across the surface of the coverplate 624. In the illustrated embodiment, the coverplate 624 includes a pair of coverplate portions 624*a*, 624*b* connected together and mounted on the top plate 600 to facilitate mounting the coverplate 624 around the rotatable shaft. The coverplate portions 624*a*, 624*b* can be connected together via any suitable connection means, for example, in this embodiment, the portions are connected via a puzzle connection (e.g., interlocking parts of each portion). It is appreciated that the coverplate 624 can include more than two portions which can be connected using any suitable method/means.

Now referring to FIGS. 16B to 16E, a bolt protector 650 configured to additionally, or alternatively, protect the bolt heads 622 is provided. The bolt protector 650 can include a well 652 defining a recess for receiving the bolt therein, with a protrusion at the bottom of the well to allow the shaft of the bolt to extend therethrough. The well 652 can have any suitable shape adapted to receive and house the bolt head 622, such as hexagonal for example, which can further prevent the bolt head 622 from rotating within the well 652. It should thus be understood that the bolt protector 650 can be inserted in a hole on the to plate 600 (or any other structure) prior to inserting the bolt (e.g., the first or second connector) within that same hole. The bolt protector 650 can be connected to the structure with a friction fit to provide a relatively snug fit and prevent the well 652 to rotate when installed.

The bolt protector 650 illustratively includes a base portion 654 surrounding the well 652 at a top end thereof, and being configured to rest upon the surface of the structure to which the bolt is connected to. In other words, the base 654 provides a lip extending outwardly around the well 652 for positioning the bolt protector 650 accordingly. The bolt can be niched within the well 652 in a manner such that the base 654 extends above the bolt head 622 for protecting it from input material particles which are whirled around within the interior chamber 28. The bolt protector 650 is preferably constructed using wear-resistant material.

In some embodiments, the base 654 of the bolt protector 622 can be shaped and sized to at least partially direct flow away from the bolt head 622. For example, the base 654 can have a streamlined shape, such as a teardrop, having a narrower section (i.e., a tip 656) extending away from the well. Airflow currents within the interior chamber 28, and along the surface to which the bolt protector 650 is connected, can be diverted at the tip 656 towards the sides of the base 654. In some embodiments, the tip 656 can be positioned in a direction of anticipated airflow to assist in diverting the air around and/or above the bolt head 622.

In some embodiments, each rotor arm 122 can include protective features for protecting the different parts of the rotor arm 122. In some embodiments, the protective features are adapted to be swapped out, or replaced, when the amount of wear reaches a predetermined level.

With reference to FIGS. 16A and 17 to 20, each rotor arm 122 can include a wear pad 700 removably connected at the distal end 122*b* thereof. The wear pad 700 is shaped and configured to impact materials fed into the pulverizer during rotation of the arms, and can be replaced if damaged or worn. As seen in FIG. 16A, the wear pad 700 can be substantially rectangular and be connected at the distal end 122*b* via fasteners (e.g., bolts, screws, glue, etc.). In the illustrated embodiment, the fasteners are bolts extending through a front face 702 of the wear pad 700 and through the rotor arm 122. Moreover, the front face 702 is generally flat which can promote having material break upon impacting the wear pad 700. Other configurations of the wear pad are possible and will be described further below.

In addition to the wear pad 700, each rotor arm 122 can be provided with an arm protector 704 connected thereto and extending between the rotor hub 120 and the wear pad 700 for protecting the corresponding part of the rotor arm 122. The arm protector 704 can be connected to the rotor arm 122 using any suitable fasteners or via any suitable method. For example, in this embodiment, each rotor arm 122 includes a protector slot 706 (FIG. 18) positioned near the proximal end and facing away from the hub. The protector slot 706 is shaped and sized to receive a first end of the arm protector 704 and is adapted to retain said first end therein. The arm protector 704 extends axially along the front face of the rotor arm 122 towards the wear pad 700, whereby a second end of the arm protector 704 engages the wear pad 700 to be positioned, and substantially secured, between the wear pad 700 and the distal portion 122*b* of the rotor arm 122. Therefore, the arm protector 704 can be effectively retained in position on the rotor arm 122 without the use of fasteners extending through the arm protector itself.

Figure 17:
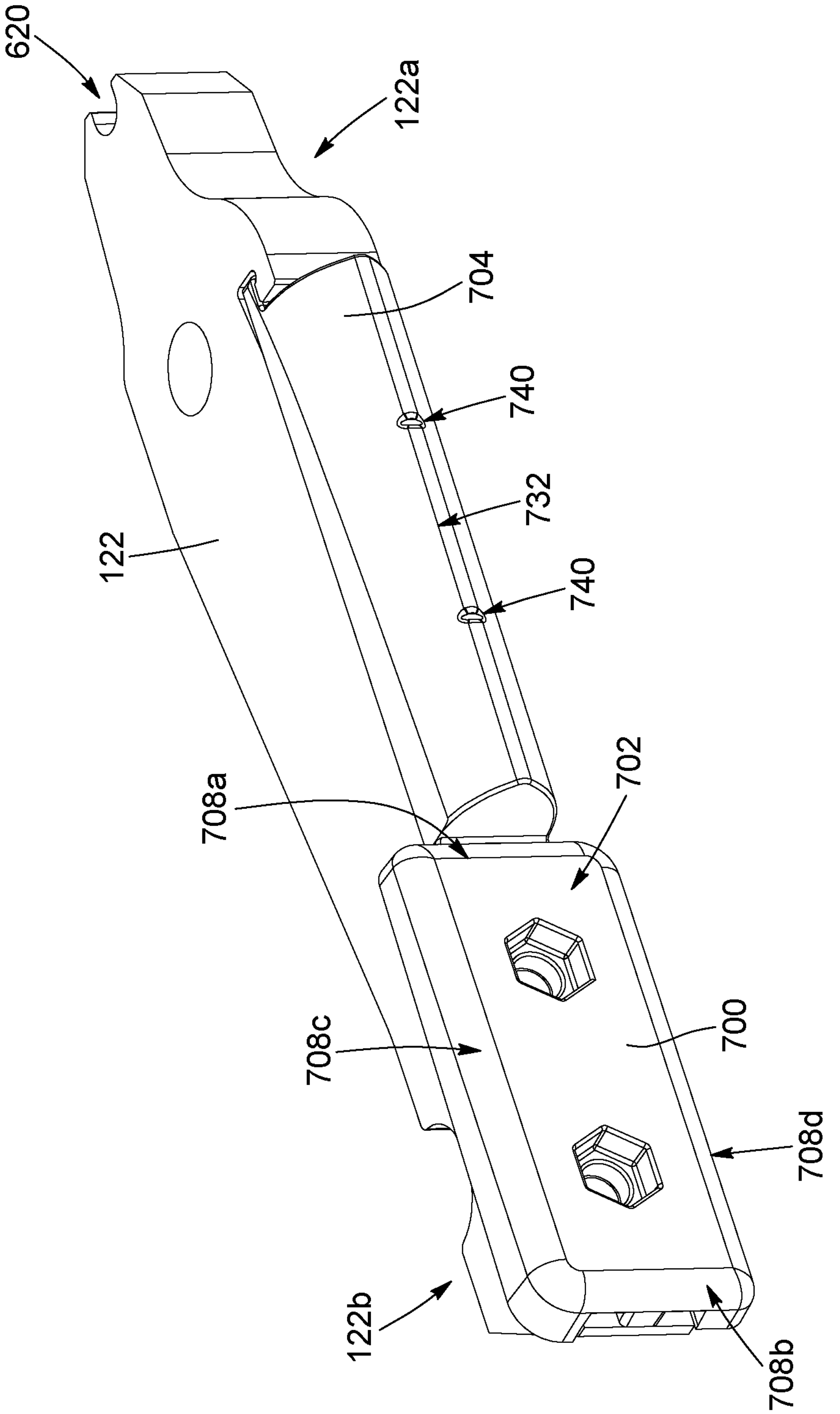
FIG. 17 is a perspective view of a rotor arm according to an embodiment, showing a wear pad connected at a distal end of the arm, and an arm protector.
Figure 18:
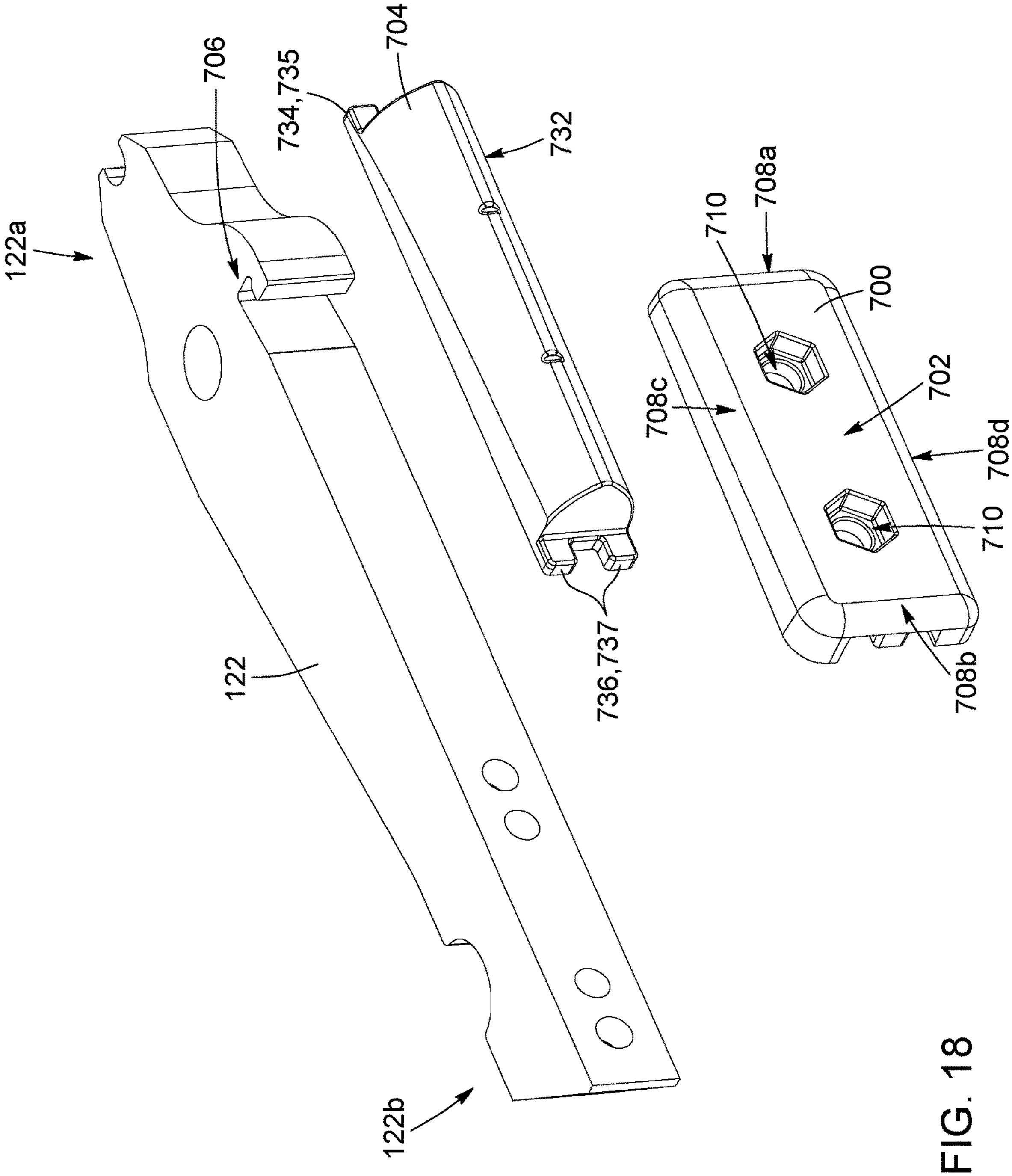
FIGS. 18 and 19 are rear perspective views of the wear pad shown in FIG. 17 according to an embodiment, showing a channel extending therealong and sections having different thicknesses.

Still with reference to FIGS. 17 and 18, an exemplary embodiment of a rotor arm is illustrated. In this embodiment, the wear pad 700 has rounded, or curved edges 708*a*, 708*b*, 708*c*, 708*d* extending around the front face 702 thereof. It is appreciated that the curved edges can assist in reducing drag, thus increasing aerodynamics of the rotor arm 122, while also reducing the amount of material wrapping about the wear pad 700. Furthermore, the wear pad 700 can have a height (i.e., the distance between the top and bottom edges 708*c*, 708*d*) exceeding that of the rotor arm 122 to promote material impacting the front face 702 of the pad. In other words, the top and bottom edges 708*c*, 708*d* of the wear pad illustratively overhang the rotor arm 122 about its distal end 122*b*. For example, the height of the wear pad 700 can exceed the height of the arm by at least 150%, but no more than 300%, although it is appreciated that other configurations are possible. Similarly, the wear pad 700 can have any suitable length (i.e., the distance between the rear and forward edges 708*a*, 708*b*) such that the wear pad 700 can be secured to the rotor arm 122, while also having the forward edge 708*b* extend further than the distal end 122*b*.

In some embodiments, the heads of the fasteners used for connecting the wear pad 700 to the rotor arm 122 can be received in cavities 710 formed in the front face 702. The bolt heads can engage the cavities such as to be recessed relative to the front face 702, or co-planar therewith. Moreover, when engaged in the cavities 710, rotation of the bolt heads can be prevented, or at least hindered to avoid accidental disconnection of the wear pad 700 from the rotor arm 122.

Figure 19:
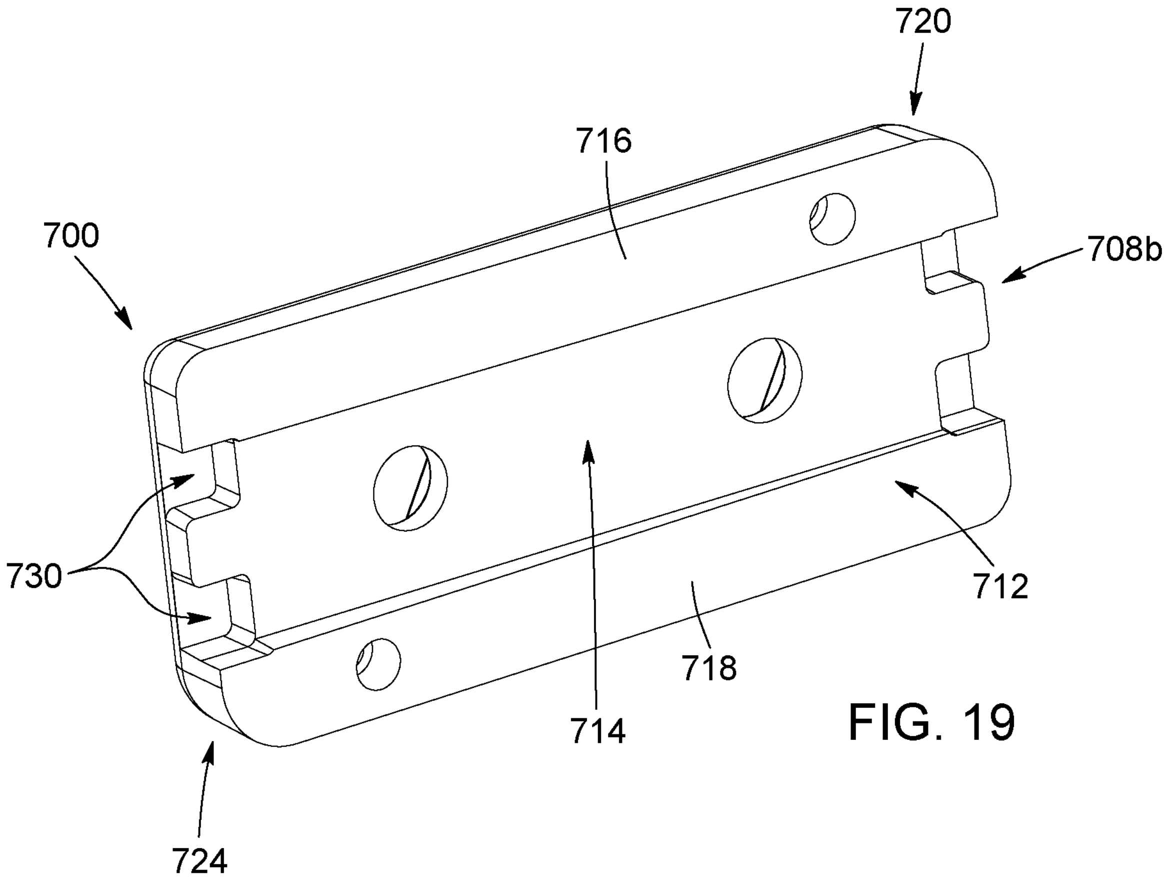
Figure 20:
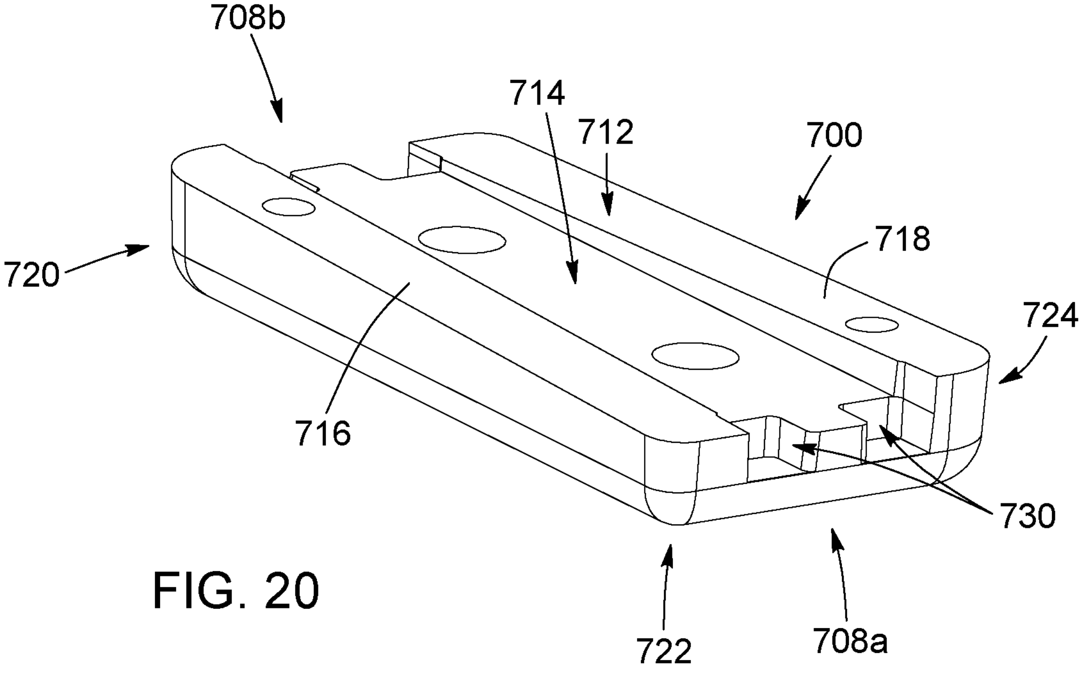
FIG. 20 is an exploded view of the rotor arm shown in FIG. 17, showing pad and arm engaging elements extending from either ends of the arm protector, according to an embodiment.

As seen in FIGS. 19 and 20, the wear pad 700 further has a rear face 712, opposite the front face, adapted to engage the front face of the rotor arm when connected thereto. The wear pad 700 can have a channel 714 extending across a length of the rear face 712 for receiving at least a portion of the arm therein. In this embodiment, the rear face 712 includes top and bottom flanges 716, 718 defined on either side of the channel 714 and extending along the length of the wear pad. The top and bottom flanges 716, 718 are shaped and configured to at least partially wrap around the rotor arm when it is engaged in the channel to assist in maintaining the wear pad 700 in a desired position upon the arm. It is noted that having the wear pad partially wrap around the rotor arm can promote distribution of forces applied to the rotor arm, for example from impacting material on the wear pad.

In the illustrated embodiment, the wear pad 700 is provided with additional material in locations where more deterioration is anticipated to increase the lifespan of the wear pad. In the present embodiment, it is understood that impacts occur on the front face 702 of the wear pad. However, rotation of the rotor arms generates flow currents moving radially outwardly (e.g., towards the housing sidewall 26), such that the forward edge **708*b* can become worn faster than other locations of the wear pad. More specifically, it is noted that a top corner 720 of the forward edge 708*b* corresponds to the location of the wear pad 700 which deteriorates at a faster rate. As such, additional material can be provided at and/or proximate the top corner 720. As seen in FIG. 20, adding material to the top corner 720 can cause the top flange 716 to have a decreasing thickness along the length of the wear pad (e.g., along the channel 714). In other words, the top corner of the forward edge 720 has a greater thickness than the corner 722 of the rear edge 708*a***.

In some embodiments, additional material can be provided to diagonally opposite corners of the wear pad 700 such that the wear pad can be rotated on the rotor arm. More specifically, the wear pad is rotated such that the top corner of the forward edge becomes the bottom corner of the rear edge, and vice-versa. Therefore, once the forward edge **708*b* becomes worn (e.g., the thickness of the top corner 720 has decreased to a predetermined threshold), the wear pad can simply be flipped instead of replaced, effectively increasing (e.g., doubling) the lifespan of the pad. It should thus be understood that the bottom flange 718 can have a decreasing thickness from the rear edge 708*a* to the forward edge 708*b* due to the added material at the bottom corner 724 of the rear edge. Moreover, it is appreciated that reduced amount of material can be provided at locations where deterioration is minimal in order to reduce overall mass of the wear pad, therefore reducing the force applied on the arm during rotation thereof within the interior chamber 28**.

Still referring to FIGS. 19 and 20, the wear pad 700 can be provided with pad slots 730 positioned along the rear and/or forward edges **708*a*, 708*b* and opening on the rear surface 712. The pad slots 730 can be shaped and sized to receive corresponding parts of the arm protector 704 in order to at least partially secure the arm protector on the rotor arm, as will be described further below. It is noted that pad slots 730 can be provided on both the rear edge and the forward edge such that when the wear pad 700** is flipped, the arm protector can still engage the wear pad in the same manner.

Referring back to FIGS. 17 and 18, the arm protector 704 can have a curved or rounded front surface 732 adapted to reduce drag and thus increase aerodynamics of the rotor arm during operation of the pulverizer. The rounded front surface 732 can further reduce the chance of material wrapping around the rotor arm, as material can contact the front surface at angles of less than 90 degrees, thus promoting deflection of the material above and/or under the rotor arm. In this embodiment, the arm protector 704 is substantially elongated to cover the rotor arm between the wear pad 700 and the rotor hub. As mentioned above, a first end of the arm protector 704 is configured to engage the rotor arm (in the protector slot 706), and a second end engages the wear pad 700 (in the pad slots 730).

More particularly, the arm protector 704 includes arm-engaging elements 734 extending from the first end shaped and configured to effectively engage the protector slot 706 of the arm. The arm-engaging elements 734 can include one or more prongs 735, or tabs, extending radially outwardly from the first end of the arm protector 704. The prongs 735 can be parallel to one another, although it is appreciated that other configurations are possible (e.g., the prongs 735 being inclined towards or away from one another). The protector slot 706 can include a corresponding internal tab (not shown) adapted to extend between the prongs 735 of the arm protector 704 when engaging the first end with the protector slot 706. As such, it is noted that the internal tab can assist in keeping the arm protector 704 from moving up and/or down when engaged therewith.

Similarly, the arm protector can include pad-engaging elements 736 extending from the second end being shaped and configured to effectively engage the pad slots 730 of the wear pad. The pad-engaging elements 736 can be prongs, or tabs 737 extending radially outwardly from the second end of the arm protector 704. In this embodiment, the pad-engaging elements 736 and the arm-engaging elements 734 can be substantially the same such that the arm protector 704 can be installed with either end engaging either one of the arm or wear pad. In this embodiment, the arm protector 704 is also provided with additional material in locations where deterioration is greater to increase durability, and reduced material in other locations to reduce overall weight. The arm protector can be configured to have similar characteristics in diagonally opposite sections in order to allow the arm protector to be flipped on the rotor arm, and thus increase lifespan of the arm protector before needing to replace it.

Figure 21:
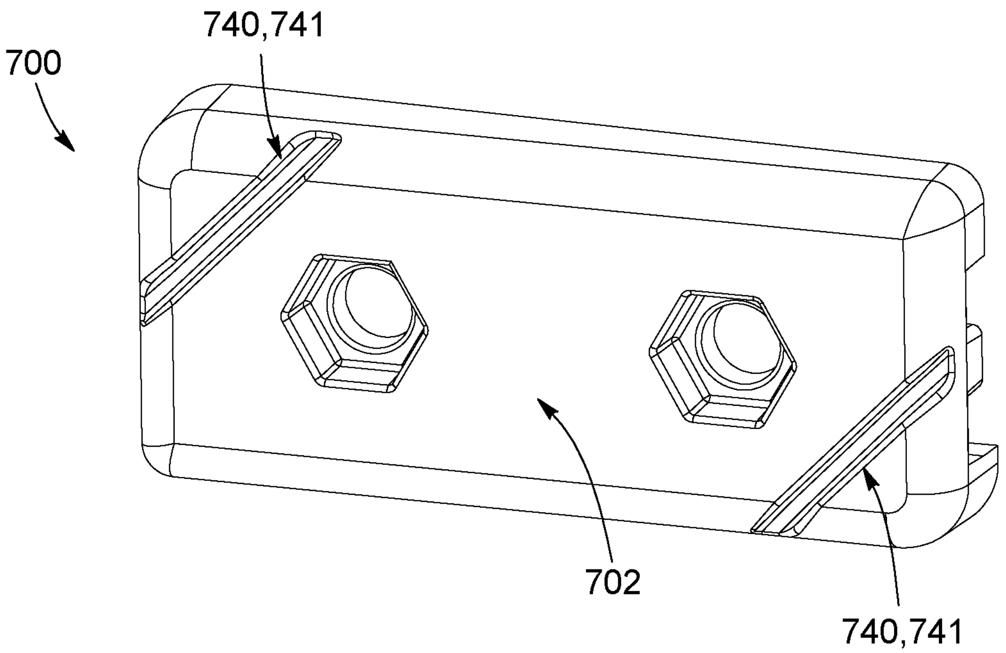
FIGS. 21 and 22 are front perspective views of a wear pad according to possible embodiments, showing wear indicators provided on the front face of the wear pad.
Figure 22:
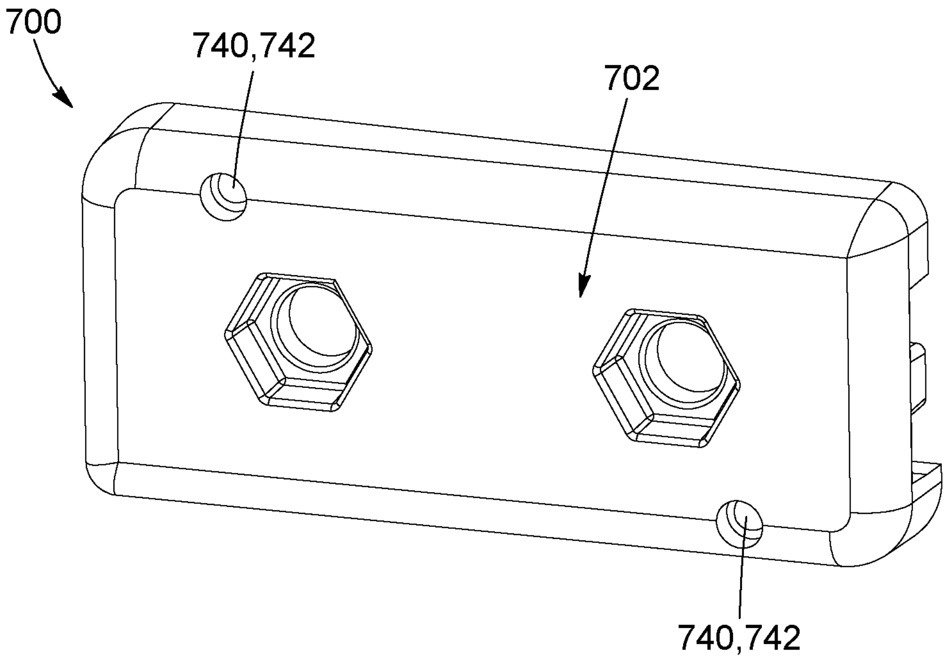

Now referring to FIGS. 17, 21 and 22, in order to determine the amount of wear of the wear pad 700 and/or arm protector 704, wear indicators 740 can be provided on the corresponding front face of the wear pad 702 and/or arm protector 732. The wear indicators 740 are preferably positioned in locations of anticipated high wear, similar to the additional material described above, and can provide information on the amount of deterioration (i.e., wear) undergone by the wear pad or arm protector. In the embodiment of FIG. 21, the wear indicators 740 can include grooves 741 extending across the front face 702 of the wear pad in the corner where greater deterioration is anticipated (e.g., the top corner of the forward edge). As the wear pad 700 is worn down during use, the depth of the groove 741 will gradually decrease until it disappears, leaving a relatively flat front face 702, thereby providing an indication that the wear pad 700 needs to be replaced or rotated.

Alternatively, the wear pad can include a second groove 741 diagonally opposite the first groove, such that flipping the wear pad on the rotor arm positions the second groove in the position of the first groove. As such, it is understood that once the first groove disappears due to deterioration, the wear pad can simply be flipped instead of replaced, and operation of the pulverizer can resume until the second groove is worn down. FIG. 22 show another exemplary embodiment of the wear indicators 740, including bores 742 adapted to function similarly to the grooves 741 previously described. It is appreciated that any other suitable configuration of the wear indicators 740 are possible for indicating the amount of deterioration undergone by the wear pad. As seen in FIG. 17, it is further appreciated that the arm protector 704 can also include wear indicators 740 provided on the front surface 732 thereof for assisting in indicating when a given arm protector should be flipped or replaced.

The wear pad 700 and/or arm protectors 704 can be manufactured by casting in order to produce the required shapes, and provide the additional (or reduced) material in predetermined portions of the pad or protector. Additionally, it is appreciated that the wear pad and arm protector can be made of steel, and more specifically from hardened steel such as AR steel or HX steel, although any other suitable material is possible.

Figure 24:
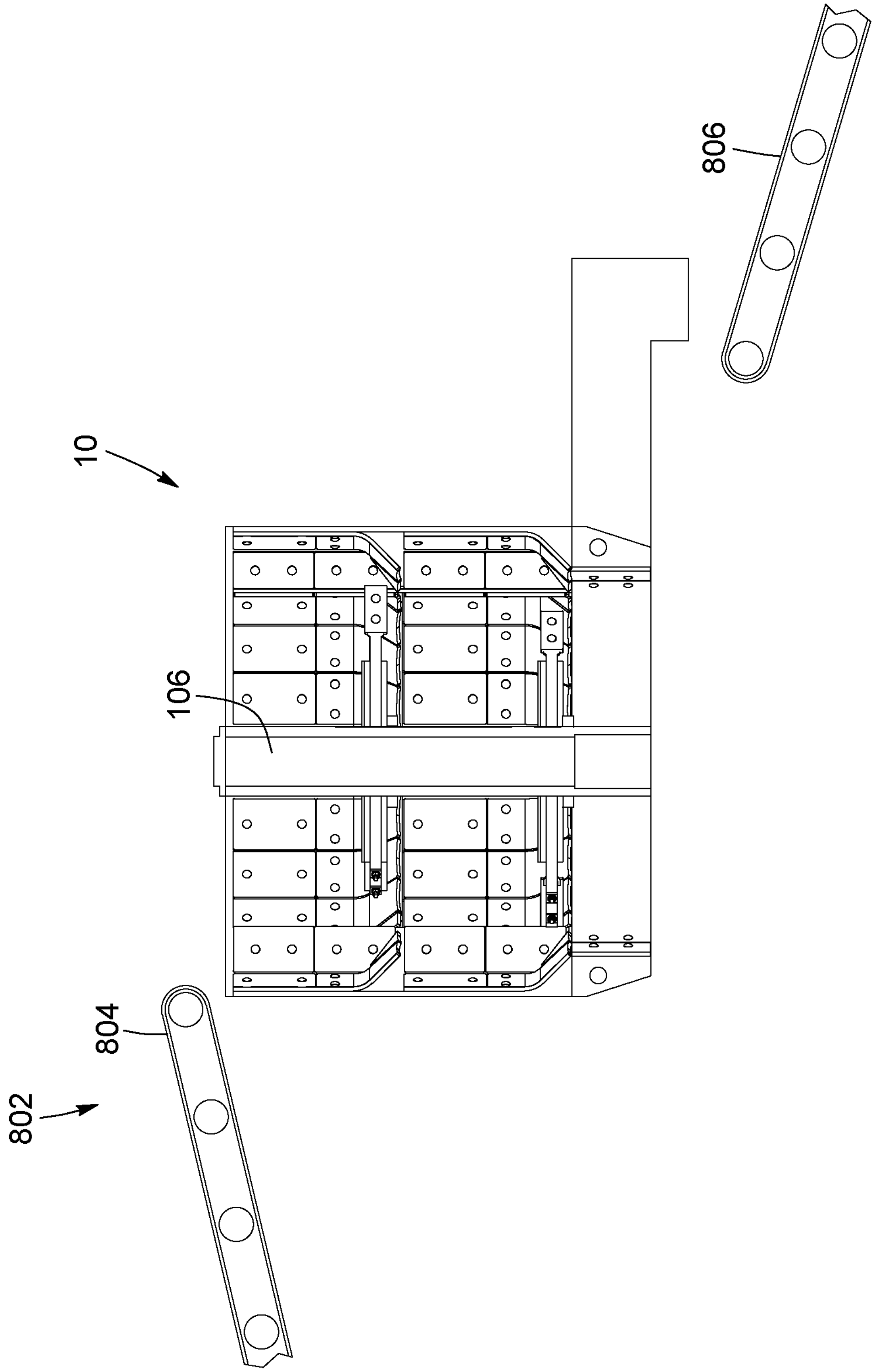
FIG. 24 is schematic view of the pulverizer illustrated in FIG. 1, with an infeed conveyor and an outfeed conveyor.

Referring to FIG. 24, in addition to broadly referring to FIGS. 1 to 23, the pulverizer 10 can include a control system configured to control one or more of the operable components of the pulverizer. The pulverizer can include auxiliary systems, such as a dust collection system for cleaning purposes, a vacuum system for creating a vacuum within certain regions of the housing of the pulverizer and/or a conveying system 802 for transporting material to and from the pulverizer, among others. As such, the control system can be configured for controlling any one of the above-mentioned systems. Furthermore, it is noted that the control system can further control the feed rate of material, the rotational speed of the rotatable shaft 106 or the power consumption of the motor 105, among other features, which can increase performance characteristics of the pulverizer 10.

The control system can also improve some safety features of the pulverizer, for example, by assisting in removing material wrapped around the rotor arms 122 or hubs 120, or by decreasing (or stopping) feed rate of material when a malfunction is identified (e.g., the release mechanism 610 activates for one or more rotor arms 122). It is appreciated that material can be fed into the housing via the conveying assembly, and that the feed rate can be controlled by controlling the speed of an infeed conveyor 804. An outfeed conveyor 806 can also be provided proximate the outlet of the housing for receiving and transporting reduced materials away from the pulverizer. It is appreciated that the outfeed conveyor 806 can redirect material back to the infeed conveyor 804 in situations where the materials require additional grinding/pulverizing. It should be understood that the direction of the outfeed conveyor can be controlled by the control system.

In this embodiment, the control system includes a processor operatively connected to at least one of the rotatable shaft 106, the motor 105 and the conveying assembly 802 for controlling a speed thereof. It should be noted that the processor can be further operatively connected to various components or systems of the pulverizer, such as the shelves for example, whereby the angle or vertical position can be adjusted. The control system further includes one or more sensors positioned at various locations within or around the pulverizer for monitoring one or more conditions of the pulverizer. The sensors can be operatively connected to the processor 810 such as to control the above-mentioned components based on input provided by the sensors.

In some embodiments, the sensors can include a speed sensor for effectively communicating the speed of the shaft to the processor. Alternatively, the speed sensor can be configured to detect the rotation speed of the rotor arms, instead of the rotatable shaft, although other configurations are possible. The speed sensor can assist in maintaining a substantially constant rotational speed of the rotatable shaft within the housing. For instance, during normal operations, if a particularly hard product is fed into the housing via the inlet, the rotational speed of the shaft may decrease. In order to ramp back up to normal operating conditions, the processor can be provided with a ramp up speed routine, whereby instead of attempting to instantaneously maintain speed, the ramp up routine can be selected such as to gradually increase the speed. In some embodiments, the motor is a variable speed motor having a variable frequency drive, whereby the processor can assist in controlling the speed of the motor.

The speed sensors can also provide information on the performance of the pulverizer. For example, if the detected speed of the rotor arms 122 or motor 105 decreases, it might be an indication that material has wrapped around one or more of the rotor arms. In other words, the processor can, with assistance from the sensors, be adapted to detect wrapping of material about the rotor arms based on performance of the pulverizer 10. In such cases, the control system 800 can be configured to control the motor 105 to reverse the direction of rotation of the rotatable shaft 106 in order to dislodge the wrapped material. Alternatively, the speed of the rotatable shaft can be increased in an attempt to dislodge the material (e.g., if the resistance caused by the material is deemed too low to reverse the direction of rotation). Wrapping of material can also be detected by monitoring the motor 105 connected to the rotatable shaft. An increase in the amperage required to operate the pulverizer at constant speeds can be an indication of material wrapping.

Additionally, a shaft wrapping removal system (not shown) can be provided to remove material wrapped near the top of the rotatable shaft. The rotatable shaft can be provided with spacing ribs adapted to deflect material away from the rotatable shaft. As material travels along the spacing rib(s), it may encounter one or more blades configured to cut through the material. Additionally, or alternatively, the shaft wrapping removal system can include a shedding cone outwardly extending from the shaft to assist in directing material back into the interior chamber of the housing, or towards the blades proximate the ribs.

In some embodiments, two or more components of the pulverizer can be operatively linked to one another in a manner such that if the speed of a first component decreases, then the speed of any linked component decreases along with it. For example, the infeed conveyor 804 can be linked to the rotatable shaft 106 such that if an object were to hinder performance of the shaft, thus reducing the rotational speed thereof, the speed of infeed conveyor 804 would correspondingly decrease to adjust for the speed of the shaft 106 and/or rotor arms 122. The speed of the conveyors can also be monitored via another speed sensor operatively connected to the processor which can be useful to control the speed of the material being fed into the housing, although other configurations are possible. It is appreciated that monitoring and/or controlling the input speed (i.e., the speed of the conveyor) and the rotational speed of the rotatable shaft 106 can allow for the control system to address various operating conditions. Furthermore, depending on the type of material being fed through the inlet, the speed of the conveyor can be selected relative to the rotational speed of the shaft and rotor arms required to efficiently pulverize the material.

Additionally, or alternatively, the sensors can include pressure sensors for monitoring and/or controlling the internal pressure of the housing. The pressure can thus be controlled, for example, by operating a vacuum of the dust collection system, or another system. In some embodiments, it is preferable to maintain the internal pressure below atmospheric pressure to promote reduction of the size of the material fed into the housing. The processor can control the pressure such as to maintain a substantially constant vacuum in some regions, such as proximate the outlet, which can further assist in directing the material towards the outlet and onto the outfeed conveyor 806.

In yet another embodiment, the sensors 822 can include a vibration sensor configured to detect vibrations occurring on various components of the pulverizer (e.g., housing, shelves, deflectors, arms, hubs, etc.). As such, the processor can be adapted to decrease the speed of the motor 105, conveyors 804, 806 or rotatable shaft 106 upon the detection of vibrations exceeding a predetermined vibratory threshold. Moreover, the processor can be adapted to completely stop the pulverizer 10 upon detection of vibrations exceeding a predetermined emergency vibratory threshold. Vibrations can occur if the release mechanism 610 of a rotor arm 122 was actuated (e.g., the shear pin broke), if the wear pad 700 of an arm was damaged, if material has wrapped around one or more of the rotor arms, or if caused by any other complicating factors.

Other sensors and/or systems can be included. For example, a door locking device can be provided to control the access door of the housing to prevent accidentally opening the door. In some embodiments, the door locking device can be configured to maintain the door closed during rotation of the rotatable shaft. In other words, the access door may be opened when the rotatable shaft is stationary.

Figure 25:
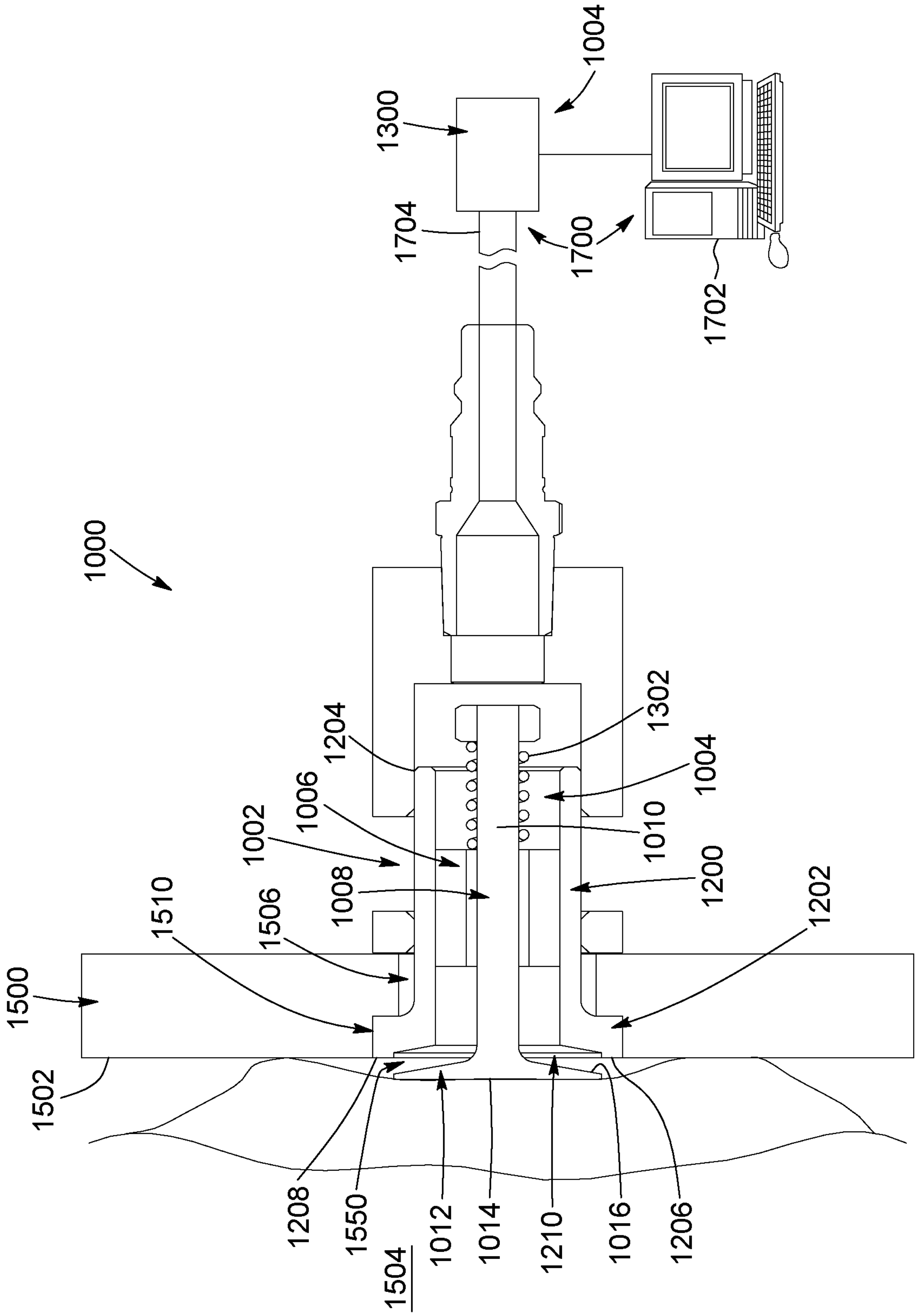
FIG. 25 is a cross-section view of an anti-caking device for removing caked material from a surface of a wall, in accordance with an embodiment.
Figure 26:
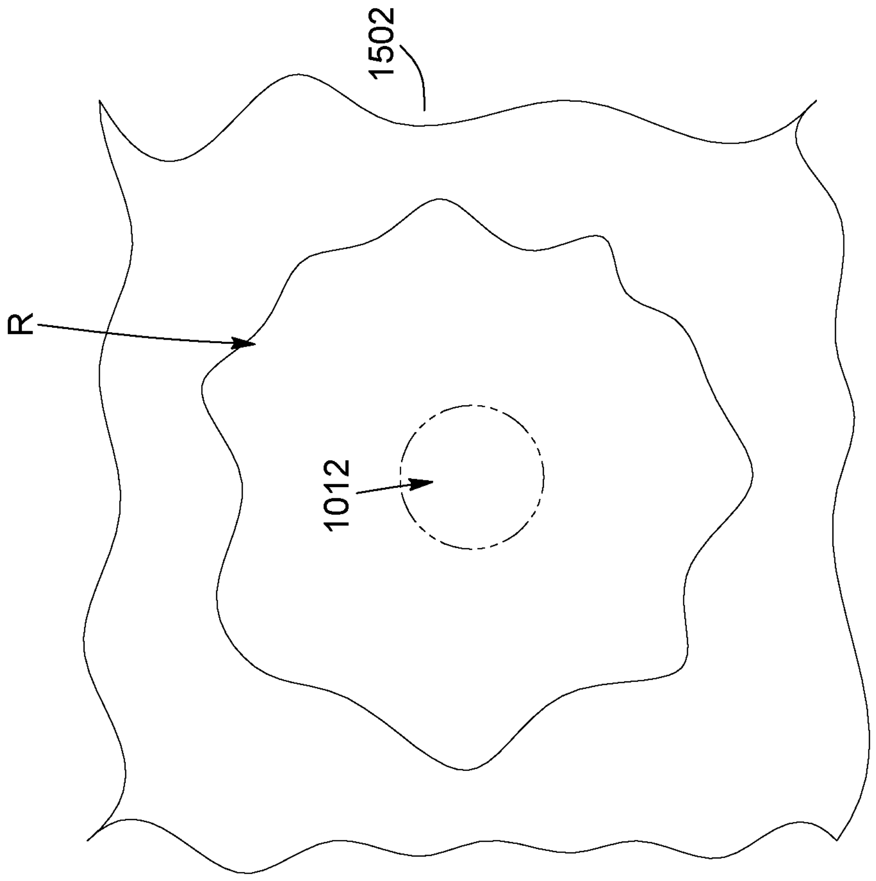
FIG. 26 is a front elevation view of the anti-caking device illustrated in FIG. 25, showing a plunger head of the device creating an expanding region of detached caked material over the internal wall surface surrounding the anti-caking device.

Now turning to FIGS. 25 and 26, there is further provided an anti-caking device 1000 for removing caked-on material from a wall 1500, in accordance with one embodiment.

The anti-caking device 1000 is used for removing "caked-on" material from surfaces of the vessel to which the material may become stuck. The anti-caking device 1000 may be particularly useful to remove caked on material when the caked-on material has formed a continuous layer of caked-on material over at least a portion of a surface of a vessel.

The vessel could include the pulverizer 10, and more specifically the housing 20 of the pulverizer 10, as particles of input material may become stuck to the housing liner 406 during operation of the pulverizer 10.

Alternatively, the vessel could include a garbage/waste truck, a cement mixer, a paint spray booth or the like, or even an entire room, container or enclosure with walls or surfaces on which material may tend to become stuck and caked on.

It will be appreciated that traditional methods for removing caked-on material from a wall of a vessel include using a pressure washer or a similar device to spray water or another cleaning fluid on an exposed surface of the caked-on material, but that this method is generally time consuming, may lead to a waste of a large amount of water or cleaning fluid, and/or may not succeed in efficiently removing the caked-on material from the surface of the vessel.

In the embodiment illustrated in FIGS. 25 and 26, the device 1000 extends into the wall 1500 of a vessel. As explained above, the wall 1500 of the vessel could correspond to the housing sidewall 26 of the pulverizer 10, for example.

Specifically, the device 1000 extends into the wall 1500 beyond an internal wall surface 1502 of the wall 1500 which faces towards an interior chamber 1504 of the vessel.

Still referring to FIGS. 25 and 26, the device 1000 includes a casing 1002 recessed into the wall 1500. Specifically, the casing 1002 is sized and shaped to be snuggly received in a bore 1506 which extend into the wall 1500, beyond the internal wall surface 1502. In one embodiment, the casing 1002 and the bore 1506 are both generally cylindrical. Alternatively, the casing 1002 and the bore 1506 could both have a rectangular cross-section, or any other suitable shape.

In the illustrated embodiment, the casing 1002 includes a casing body 1200 and an end portion 1202 which extends radially outwardly from the casing body 1200. Specifically, the casing body 1200 includes a distal end 1204 located away from the internal wall surface 1502 and a proximal end 1206 located towards the internal wall surface 1502, and the end portion 1202 is located at the proximal end 1206 of the casing 1202.

The end portion 1202 further includes an end surface 1208 which faces away from the distal end 1204 of the casing body 1200. When the casing 1002 is received in the bore 1506, the end portion 1202 is received in a wall recess 1510 extending into the wall 1500 and around the bore 1506, the end portion 1202 being sized and shaped such that the end surface 1208 is substantially flush with the internal wall surface 1502.

The device 1000 further includes a pushing force generator 1004 coupled to the casing 1002 for generating a pushing force from the casing 1002, and more specifically from within an internal cavity 1006 of the casing 1002, towards the interior chamber of the vessel to push the caked material received on the internal wall surface 1502 away from the wall 1500 from behind the caked material and into the interior chamber 1504.

In the illustrated embodiment, the pushing force generator 1004 includes a solid component, and more specifically a plunger 1008, movably received in the internal cavity 1006 of the casing 1002. The plunger 1008 includes an elongated plunger body 1010 positioned generally coaxially to the internal cavity 1006 and a plunger head 1012 located towards the internal wall surface 1502.

The plunger 1008 is configured to move axially within the internal cavity 1006 between a closed position in which the plunger head 1012 is substantially aligned with the internal wall surface 1502 and an open position in which the plunger head 1012 is moved beyond the internal wall surface 1502 into the internal chamber 1504. Specifically, the plunger head 1012 includes a distal face 1014 located away from the casing 1002 and a proximal face 1016 located towards the casing 1002. In the illustrated embodiment, the distal face 102 is substantially planar. When the plunger 1008 is in the closed position, the distal face 1014 is substantially flush with the internal surface 1502 of the wall 1500. In the illustrated embodiment, the distal face 1014 is also substantially flush with the end surface 1208 of the casing 1002. In this position, the proximal face 1016 is also received in a corresponding recess 1210 which is defined in the end portion 1202 of the casing 1002. In the illustrated embodiment, the proximal face 1016 is tapered and the corresponding recess 1210 is similarly tapered. Alternatively, the proximal face 1016 and the corresponding recess 1210 could have any other suitable shape.

When the vessel is operated, the plunger 1008 is in the closed position such that the distal face 1014 is flush with the internal wall surface 1502. Material is therefore received and caked substantially uniformly and continuously over the distal face 1014 and the internal wall surface 1502 surrounding the distal face 1014. When the plunger 1008 is moved from the closed position to the open position, the plunger head 1012 pushes at least a portion of the caked material located on the internal wall surface 1502 over and near the plunger head 1012 away from the wall 1500.

It will be understood that it may be beneficial to move the plunger head 1012 to the open position with relatively low pushing force and/or at relatively low speed to prevent the plunger head 1012 from simply punching a hole through the caked material. Instead, the caked material pushed away from the wall 1500 by the plunger head 1012 may remain attached to adjacent caked material such that further outward movement of the plunger head 1012 towards the open position will detach the caked material from the internal wall surface 1502 in an expanding region R which has a larger area than the plunger head 1012, as best shown in FIG. 26. Eventually, fissures or fractures may form in the detached caked material and one or more pieces of the detached caked material may fall into the vessel where it can be easily collected.

In one embodiment, the pushing force generator 1004 further includes a fluid supply 1300 in communication with the internal cavity 1006 of the casing 1002. The fluid supply 1300 is configured to provide a fluid, such as air or water, through the internal cavity 1006 of the casing 1002 to further push the caked material away from the wall 1500. More specifically, when the plunger 1008 is moved to the open position, a gap 1550 is formed between the plunger head 1012 and the end portion 1202 of the casing 1002. The gap 1550 defines a fluid inlet to allow the fluid to be provided out of the gap 1550 to assist in removing the caked material from the internal wall surface 1502. The fluid may further contribute to enlarge the expanding region R of detached material and/or contribute to detaching pieces of caked material.

In the illustrated embodiment, the fluid supply 1300 is further configured to provide the fluid under pressure to move the plunger 1008 from the closed position to the open position. Still in the illustrated embodiment, the plunger 1008 is further spring-biased to return to the closed position by a spring 1302 coaxially mounted on the plunger body 1010. To move the plunger 1008 from the closed position to the open position, the fluid pressure must therefore be sufficient to counteract the force of the spring 1302. In one embodiment, the spring 1302 is adjustable to allow its stiffness to be modified as desired. Alternatively, the spring 1302 may not be adjustable.

In one embodiment, the fluid supply 1300 is configured to provide the fluid at a preselected pressure. For example, the fluid supply 1300 may be configured to provide the fluid at a pressure of 5 psig or about 34.47 kPa to 10 psig or about 68.95 kPa. Alternatively, the device 1000 may be configured to allow the pressure of the fluid to be varied.

In the illustrated embodiment, the device 1000 further includes a control system 1700 operatively connected to the fluid supply 1300 for controlling the pressure of the fluid. Specifically, the control system 1700 includes a processing unit 1702 such as a personal computer or the like and one or more valves 1704 coupled to the processing unit 1702 and to the fluid supply 1300 to allow the processing unit to control the valves 1704.

Using the valves, the fluid pressure can be varied to remove caked material depending on a condition inside the vessel. In one embodiment, the fluid pressure can be varied up to an upper limit of 40 psig or 275.79 kPa to avoid punching through the caked material as described above. Alternatively, the device 1000 could be configured such that the fluid pressure has a different upper limit or has no upper limit.

In one embodiment, the control system 1700 is configured such that when the plunger 1008 is in the open position, the fluid may be provided according to a desired pattern in which the fluid pressure varies over time in different intervals. Specifically, the pressure of the fluid could progressively increase from one interval to a subsequent interval. For example, the control system 1700 could be configured to provide the fluid at 0 to 5 psig for two seconds, at 5 to 10 psig for two seconds, at 20 psig for two seconds and at 40 psig for 40 seconds. It will be understood that various other patterns may be considered.

It will be understood that the above embodiments are provided as examples only and that many other variations are possible. For example, the pushing force generator 1004 may not comprise a plunger and could comprise only the fluid supply 1300. It will further be appreciated that although a single anti-caking device was shown and described above, it may be beneficial to use a plurality of such anti-caking device spaced apart from each other to cover a relatively large surface area of the internal wall surface 1502.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A pulverizer comprising:

a housing having top and bottom ends, the housing further having an inlet located towards the top end for receiving input material to comminute and an outlet located towards the bottom end for discharging pulverized input material from the housing, the housing including a housing sidewall having an inner surface extending between the top and bottom ends and defining an interior chamber, the housing having a central housing axis;

a rotatable shaft extending between the top end and the bottom end of the housing along the central housing axis;

at least two rotor assemblies coupled to the rotatable shaft and spaced apart along a length of the rotatable shaft, each of the at least two rotor assemblies comprising at least one rotor arm extending outwardly from the rotatable shaft towards the housing sidewall for forming an airflow revolving about the central housing axis within the interior chamber when the rotatable shaft is rotated; and at least one airflow deflector extending inwardly into the interior chamber from the housing sidewall, the at least one airflow deflector cooperating with the at least one rotor arm to deflect the airflow generated by the at least one rotor arm so as to form at least two vortices within the interior chamber, wherein adjacent ones of the at least two vortices overlap such that input material particles in suspension in the adjacent ones of the at least two vortices collide with each other to be thereby pulverized;

wherein the at least one airflow deflector extends continuously from the top end to the bottom end, wherein the top end is positioned above an upper rotor of the at least two rotor assemblies and the bottom end is positioned below a lower rotor of the at least two rotor assemblies.

2. The pulverizer of claim 1, wherein the at least one airflow deflector comprises a flow facing deflecting surface extending away from the housing sidewall and inwardly into the interior chamber and an opposite deflecting surface extending away from the housing sidewall and inwardly into the interior chamber, the flow facing deflecting surface and the opposite deflecting surface converging towards each other and meeting at an apex spaced inwardly from the housing sidewall.

3. The pulverizer of claim 2, wherein the apex of the at least one airflow deflector is spaced apart from a tip of the at least one rotor arm by a clearance space.

4. The pulverizer according to claim 3, wherein the apex is spaced from the housing sidewall towards the central housing axis by a radial distance of 15 to 25 cm.

5. The pulverizer according to claim 3, wherein the clearance space between the apex and the tip of the rotor arms is between 1 cm and 5 cm.

6. The pulverizer according to claim 2, wherein the flow facing deflecting surface is planar.

7. The pulverizer according to claim 2, wherein the flow facing deflecting surface is angled relative to the inner surface of the housing sidewall at an angle of between 1 degree and 89 degrees.

8. The pulverizer according to claim 2, wherein the opposite deflecting surface is angled relative to the inner surface of the housing sidewall at an angle of between 1 degree and 89 degrees.

9. The pulverizer according to claim 2, wherein the flow facing deflecting surface is angled relative to the inner surface of the housing sidewall at a first deflection angle and the opposite deflecting surface is angled relative to the inner surface of the housing sidewall at a second deflection angle, wherein the first deflection angle and the second deflection angle are different from each other.

10. The pulverizer according to claim 1, wherein the at least one airflow deflector is elongated and extends parallel to the central housing axis.

11. The pulverizer according to claim 1, wherein the at least one rotor arm extends along a rotation plane which extends orthogonally through the central housing axis, the at least one airflow deflector intersecting the rotation plane.

12. The pulverizer according to claim 1, wherein the at least one airflow deflector is symmetrical about a symmetry axis extending along a radius of the housing.

13. The pulverizer according to claim 1, wherein the at least one airflow deflector includes at least two airflow deflectors that are evenly spaced from each other in an azimuthal direction around the central housing axis.

14. The pulverizer according to claim 1, wherein the at least one airflow deflector includes a number of airflow deflectors and the at least one rotor arm includes a number of rotor arms, the number of airflow deflectors being equal to the number of the rotor arms.

15. The pulverizer according to claim 1, wherein the at least one airflow deflector includes a plurality of airflow deflectors.

16. The pulverizer according to claim 1, further comprising at least one shelf extending inwardly from the housing sidewall and circumferentially around the housing sidewall, the at least one shelf being configured to deflect the airflow directed towards the shelf upwardly to temporarily maintain the input material particles in suspension above the shelf.

17. The pulverizer according to claim 16, wherein the at least one shelf includes a top shelf face extending away from the housing sidewall and downwardly.

18. The pulverizer according to claim 17, wherein the top shelf face is angled away from an inner face of the housing sidewall at a shelf angle of between 1 degree and 89 degrees.

19. The pulverizer of claim 16, wherein the at least one shelf is at least two shelves, and wherein a given one of the at least two shelves is positioned directly adjacent to a given one of the at least two rotor assemblies and an inward apex of each of the at least two shelves is spaced apart from a tip of the at least one rotor arms.

20. The pulverizer according to claim 16, wherein the at least one shelf comprises an upper planar portion configured to extend along the housing sidewall and a lower angled portion angled relative to the upper planar portion.

21. The pulverizer according to claim 20, wherein the lower angled portion includes a pair of lateral edges which taper towards each other as they extend away from the upper planar portion.

22. The pulverizer of claim 1, wherein the at least two vortices rotate in a plane orthogonal to the central housing axis.

23. The pulverizer of claim 1, wherein the at least two rotor assemblies comprise at least three rotor assemblies having the upper rotor, an intermediate rotor, and the lower rotor.

24. A method for pulverizing an input material, the method comprising:

providing the input material into a housing of a pulverizer through a top end of the housing;

generating a circular airflow within an interior chamber about a central housing axis of the housing;

deflecting the airflow generated by the airflow generator so as to form at least two vortices within the interior chamber, wherein adjacent ones of the at least two vortices overlap such that input material particles in suspension in the adjacent ones of the at least two vortices collide with each other to be thereby pulverized;

wherein generating the circular airflow includes rotating a pulverizing rotor assembly including a rotatable shaft extending along the central housing axis and at least one rotor arm extending outwardly from the shaft towards a sidewall of the housing;

wherein deflecting the airflow generated by the airflow generator is performed using at least one airflow deflector extending inwardly into the interior chamber from the sidewall to an apex spaced inwardly from the sidewall, wherein the at least one airflow deflector extends continuously from the top end to a bottom end; and wherein the apex of the at least one airflow deflector is spaced apart from a tip of the at least one rotor arm by a clearance space to form the at least two vortices.

25. A pulverizer comprising:

a housing having top and bottom ends, the housing further having an inlet located towards the top end for receiving input material to comminute and an outlet located towards the bottom end for discharging pulverized input material from the housing, the housing including a housing sidewall extending between the top and bottom ends and defining an interior chamber, the housing having a central housing axis;

an airflow generator disposed in the interior chamber for generating a circular airflow revolving about the central housing axis with particles of the input material in suspension in the airflow; and at least one airflow deflector extending inwardly from the housing sidewall for deflecting the airflow generated by the airflow generator so as to form at least two vortices within the interior chamber, wherein adjacent ones of the at least two vortices overlap such that input material particles in suspension in the adjacent ones of the at least two vortices collide with each other to be thereby pulverized;

wherein the at least one airflow deflector comprises a flow facing deflecting surface extending away from the housing sidewall and inwardly into the interior chamber and an opposite deflecting surface extending away from the housing sidewall and inwardly into the interior chamber, the flow facing deflecting surface and the opposite deflecting surface converging towards each other and meeting at an apex spaced inwardly from the housing sidewall, wherein the at least one airflow deflector extends continuously from the top end to the bottom end; and wherein the apex of the at least one airflow deflector is spaced apart from a tip of the airflow generator by a clearance space.

* * * * *